(12) United States Patent
Mitsui et al.

(10) Patent No.: US 11,444,716 B2
(45) Date of Patent: Sep. 13, 2022

(54) OPTICAL TRANSMISSION SYSTEM AND CARRIER MONITORING APPARATUS

(71) Applicant: NIPPON TELEGRAPH AND TELEPHONE CORPORATION, Tokyo (JP)

(72) Inventors: Takashi Mitsui, Musashino (JP); Toshiaki Shitaba, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/426,800

(22) PCT Filed: Jan. 31, 2020

(86) PCT No.: PCT/JP2020/003598
§ 371 (c)(1),
(2) Date: Jul. 29, 2021

(87) PCT Pub. No.: WO2020/158911
PCT Pub. Date: Aug. 6, 2020

(65) Prior Publication Data
US 2022/0131633 A1 Apr. 28, 2022

(30) Foreign Application Priority Data
Feb. 1, 2019 (JP) .............................. JP2019-017403

(51) Int. Cl.
*H04B 10/08* (2006.01)
*H04J 14/02* (2006.01)

(52) U.S. Cl.
CPC ...... *H04J 14/0221* (2013.01); *H04J 14/0227* (2013.01)

(58) Field of Classification Search
CPC .............. H04J 14/0221; H04J 14/0227; H04J 14/0298; H04J 14/02; H04B 10/50593;
(Continued)

(56) References Cited

U.S. PATENT DOCUMENTS 10,056,733 B1 * 8/2018 Taylor ..................... H01S 5/021
2004/0005866 A1 * 1/2004 Igarashi ............... H03C 3/0958
455/73

(Continued)

OTHER PUBLICATIONS

Transmission equipment for transferring multi-channel television signals over optical access networks by frequency modulation conversion, Recommendation ITU-T J.185, Jun. 2012.

*Primary Examiner* — Hibret A Woldekidan

(57) ABSTRACT

An optical transmission system includes: first and second optical transmitting units for respectively transmitting first and second optical signals that are obtained, respectively, as a result of first and second frequency-multiplexed multi-channel signals being converted by means of FM batch conversion; a carrier monitoring function unit for monitoring each carrier signal included in the optical signals; an output adjustment unit for adjusting signal intensities of the optical signals and outputting the optical signals; a multiplexer for outputting a multiplexed signal of the optical signals; an amplifier for amplifying the multiplexed signal; and first and second optical receiving units for receiving the respective optical signals included in the amplified multiplexed signal. The output adjustment unit adjusts the respective signal intensities of the optical signals such that the signal intensity at each optical receiving unit is larger than or equal to a predetermined value. The carrier monitoring function unit updates the predetermined values based on a minimum optical sensitivity that is calculated based on the amount of frequency deviation of each carrier signal included in the optical signals.

7 Claims, 12 Drawing Sheets

(58) Field of Classification Search
CPC .......... H04B 10/5059; H04B 10/50595; H04B 10/504
USPC .......... 398/34, 79, 68, 69, 76, 160, 187, 186
See application file for complete search history.

(56) References Cited

U.S. PATENT DOCUMENTS

| | | | |
|---|---|---|---|
| 2007/0206956 A1* | 9/2007 | Kikushima .......... | H04B 10/588 398/183 |
| 2007/0212073 A1* | 9/2007 | Kikushima .............. | H04N 7/22 398/79 |

* cited by examiner

OPTICAL TRANSMISSION SYSTEM AND CARRIER MONITORING APPARATUS

CROSS-REFERENCE TO RELATED APPLICATIONS

This application is a 371 U.S. National Phase of International Application No. PCT/JP2020/003598 filed on Jan. 31, 2020, which claims priority to Japanese Application No. 2019-017403 filed on Feb. 1, 2019. The entire disclosures of the above applications are incorporated herein by reference.

TECHNICAL FIELD

The present invention relates to an optical transmission system and a carrier monitoring device.

BACKGROUND ART

An FTTH (Fiber to the Home) CATV (cable television) system is known as a network system for distributing videos to subscribers' houses, for example. FIG. 11 shows an example of a network configuration of a conventional FTTH CATV system. As shown in FIG. 11, the conventional FTTH CATV system includes, for example, a headend, an optical transmitting unit, relay amplifiers, an access amplifier, and an optical receiving unit installed in each subscriber's house.

The headend receives a radio wave that carries a video signal transmitted from a broadcasting station via a transmission tower on the ground, an artificial satellite, or the like, and adjusts, e.g. amplifies the received radio wave. The headend then outputs an electrical signal based on this video signal to the optical transmitting unit. The optical transmitting unit converts the acquired electrical signal to an optical signal, and sends out this optical signal to an optical transmission path, which is constituted by an optical fiber. The optical transmission path is divided into a relay network (hereinafter "relay NW") section and an access network (hereinafter "access NW") section. The relay NW is a communication network that connects the optical transmitting unit to the access NW. In the relay NW, multiple amplifiers (hereinafter "relay amplifiers") are provided in the case where, for example, the transmission distance is long. Each of the relay amplifiers sends out an amplified optical signal to another downstream relay amplifier or to a device in the access NW section, or splits an optical signal using an optical coupler and sends out the split optical signals to both another downstream relay amplifier and a device in the access NW section. Meanwhile, the access NW is a communication network that connects the relay NW to each of the optical receiving units that terminate optical signals. Commonly, a PON (Passive Optical Network) configuration is applied to the access NW in order to distribute optical signals output from the relay NW to optical receiving units installed in a plurality of subscribers' houses. Furthermore, there may be cases where an amplifier (hereinafter "access amplifier") is also used in the access NW for the purpose of compensating loss caused by distribution of optical signals using the PON configuration, loss due to the relay amplifiers splitting optical signals, and the like, as shown in FIG. 11.

In the conventional FTTH CATV system that has the above-described network configuration, for example, an FM (Frequency Modulation) batch conversion method is used as an optical transmission method (see NPL 1). The optical transmitting unit receives a frequency-multiplexed electrical signal of multi-channel videos that is output from the headend, and collectively converts this electrical signal to a single-channel broadband FM signal. Furthermore, the optical transmitting unit converts the converted FM signal to an optical signal with a single wavelength $\lambda$ by means of intensity modulation, and sends out the optical signal to the optical transmission path. Meanwhile, the optical receiving unit, upon receiving this optical signal with the wavelength $\lambda$, converts the optical signal to a broadband FM signal by conversion to an electrical signal and demodulates the signal. Thus, the optical receiving unit can extract the frequency-multiplexed electrical signal of the multi-channel videos from the received optical signal.

Conventionally, in this country, distribution of multi-channel videos is realized by the above-described network configuration and optical transmission method. Videos distributed include BS (broadcasting satellites) broadcasts, 110-degree CS (Communication Satellites) broadcasts, terrestrial digital broadcasts, and so on. For example, conventionally, a total of 12 channels, which are an odd-number of channels from BS-1 channel to BS-23 channel, have been assigned as BS digital broadcast channels. In the aforementioned conventional BS digital broadcasts, radio waves from artificial satellites are sent out to the ground by right circular polarization. Meanwhile, in addition, BS broadcasts (intermediate frequency: 2224 to 2681 [MHz]) and 110-degree CS broadcasts (intermediate frequency: 2748 to 3224 [MHz]), which are distributed from artificial satellites to the ground using left circular polarization, have started as new 4K/8K satellite broadcasts since December 2018. The intermediate frequencies used in the new 4K/8K satellite broadcasts differ from the intermediate frequencies that are used in the existing broadcasts. For this reason, if existing broadcasting equipment does not support the intermediate frequencies of the new 4K/8K satellite broadcasts, distribution and viewing of the new 4K/8K satellite broadcasts cannot be realized by only using the existing broadcasting equipment.

To address this, as one method for further realizing distribution and viewing of the new 4K/8K satellite broadcasts in addition to distribution and viewing of the existing broadcasts, a method can be considered in which a relay NW that supports the new 4K/8K satellite broadcasts and host equipment for this relay NW are installed separately from the existing broadcasting equipment. FIG. 12 shows an example of a network configuration in the case of using this method. As shown in FIG. 12, in this network configuration, a headend, an optical transmitting unit, relay amplifiers, and a WDM (Wavelength Division Multiplexing) filter that support the new 4K/8K satellite broadcasts are newly installed in addition to the network configuration shown in FIG. 11. The WDM filter multiplexes an optical signal output from a relay amplifier for the existing broadcasts and an optical signal output from a relay amplifier that supports the new 4K/8K satellite broadcasts, and sends out the multiplexed optical signal (hereinafter "multiplexed signal") to the existing access amplifier. Here, it is assumed that the wavelength of an output beam that is output from the relay amplifier for the existing broadcasts is a wavelength $\lambda 1$, the wavelength of an optical beam that is output from the relay amplifier that supports the new 4K/8K satellite broadcasts is a wavelength $\lambda 2$, and the wavelength $\lambda 1$ and the wavelength $\lambda 2$ are different wavelengths. Here, there may be cases where the optical receiving unit for the existing broadcasts can receive the optical signal with the wavelength $\lambda 1$ but cannot receive the optical signal with the wavelength $\lambda 2$. In such cases, to enable viewers to watch the new 4K/8K satellite broadcasts, an optical receiving unit capable of receiving the optical signal with the wavelength $\lambda 2$ needs to be newly installed. Note that, if an optical receiving unit capable of receiving optical signal with the wavelength λ1 as well as the optical signal with the wavelength λ2 is used as the newly-installed optical receiving unit, the viewer can watch both the existing broadcasts and the new 4K/8K satellite broadcasts by only using the newly-installed optical receiving unit. In addition, according to the above network configuration, the network equipment for the existing broadcasts can also be used for the new 4K/8K satellite broadcasts, and thus, the device installation cost required to realize distribution and viewing of the new 4K/8K satellite broadcasts can be reduced.

In a broadcasting station, initially, pieces of analog information such as videos, sound, and data, which are constituent elements of a program to be distributed, are encoded, and converted to digital signals. These encoded digital signals are multiplexed using a multiplexing method such as MPEG2-TS (Moving Picture Experts Group 2-Transport Stream) or MMT-TLV (MPEG Media Transport Type Length Value), and thus packets are generated. Then, an error correction code is added to the generated packets. Modulation is applied to a carrier wave (carrier) using a modulation method corresponding to the type of broadcasting, and the modulated carrier signals are sent out from the broadcast station. Thus, the program to be distributed is sent out as the carrier signal from the broadcasting station, but the frequency and the signal level of the carrier signal varies depending on the video type and the program. Therefore, for example, when the new 4K/8K satellite broadcasts are started, a carrier signal corresponding to distributed programs in the new 4K/8K satellite broadcasts is newly sent out from the broadcasting station.

As described above, to enable viewers to watch the newly 4K/8K satellite broadcasts, an optical receiving unit capable of receiving the optical signal with the wavelength λ2 needs to be installed in the subscribers' houses. Furthermore, the optical transmission system needs to be designed such that the reception level of the λ2 optical signal at the optical receiving unit is larger than the minimum optical sensitivity. Regarding optical transmission in an FTTH CATV system that uses an FM batch conversion method, it is known that the minimum optical sensitivity depends on the amount of frequency deviation of each carrier signal with a predetermined frequency in the frequency-multiplexed multi-channel signals before being subjected to FM batch conversion (see NPL 1). Since the amount of frequency deviation differs between carrier signals, the minimum optical sensitivity at the optical receiving unit also differs between the carrier signals. Therefore, the optical transmission system needs to be designed such that the reception level of the λ2 optical signal at the optical receiving unit is larger than the worst (largest) value of the minimum optical sensitivity, of the minimum optical sensitivities for the respective carrier signals (which are desired to be received).

CITATION LIST

Non Patent Literature

[NPL 1] "ITU-T J.185: Transmission equipment for transferring multi-channel television signals over optical access networks by frequency modulation conversion," International Telecommunication Union, June 2012.

SUMMARY OF THE INVENTION

Technical Problem

However, even if an optical transmission system is introduced with the minimum optical sensitivity considered so as to support the new 4K/8K satellite broadcasts at the beginning of the broadcasting, there may be cases where distribution of programs using a new carrier signal will be further started later in the new 4K/8K satellite broadcasts. Here, there is a possibility that the minimum optical sensitivity for the new carrier signal takes a worse (larger) value than the minimum optical sensitivity for the conventional carrier signals (that were considered at the beginning of the broadcasting). In this case, if the optical transmission system introduced at the beginning of the broadcasting is used as-is, there may be cases where the reception level of the λ2 optical signal at the optical receiving unit does not reach the minimum optical sensitivity for the new carrier signal, and the viewers may not be able to watch the desired video.

The present invention has been made in view of the foregoing technical background, and an object of the invention is to provide a technique that enables viewing of the existing broadcasts and newly-added broadcasts even if broadcasts using a new carrier signal is added.

Means for Solving the Problem

One mode of the present invention is an optical transmission system including: a first optical transmitting unit for transmitting a first optical signal having a first wavelength that is obtained as a result of first frequency-multiplexed multi-channel signals being converted by means of FM batch conversion; a second optical transmitting unit for transmitting a second optical signal having a second wavelength different from the first wavelength that is obtained as a result of second frequency-multiplexed multi-channel signals being converted by means of FM batch conversion; a carrier monitoring function unit for acquiring the first optical signal and monitoring each carrier signal included in the acquired optical signal; an output adjustment unit for acquiring the first optical signal and the second optical signal, adjusting signal intensities of the acquired optical signals, and outputting the optical signals; a multiplexer for multiplexing the first optical signal and the second optical signal that have been subjected to signal intensity adjustment by the output adjustment unit, and outputting a multiplexed signal; an amplifier for amplifying the multiplexed signal; a first optical receiving unit for receiving the first optical signal included in the multiplexed signal that has been amplified by the amplifier; and a second optical receiving unit for receiving the second optical signal included in the multiplexed signal that has been amplified by the amplifier, wherein the carrier monitoring function unit obtains an amount of frequency deviation of each carrier signal included in the first optical signal, and calculates a minimum optical sensitivity at the first optical receiving unit based on the amount of frequency deviation, and the output adjustment unit adjusts the signal intensities of the acquired first optical signal and second optical signal such that the signal intensity of the first optical signal received by the first optical receiving unit is larger than or equal to a first predetermined value, and the signal intensity of the second optical signal received by the second optical receiving unit is larger than or equal to a second predetermined value, and updates the first predetermined value based on the minimum optical sensitivity at the first optical receiving unit calculated by the carrier monitoring function unit.

One mode of the present invention is the above optical transmission system in which the output adjustment unit adjusts the signal intensities of the first optical signal and the second optical signal such that a signal intensity of the multiplexed signal output from the amplifier is a third predetermined value.

One mode of the present invention is the above optical transmission system in which the output adjustment unit adjusts the signal intensities of the first optical signal and the second optical signal based on insertion loss that occurs in the multiplexer, and transmission loss that occurs between the amplifier and the first optical receiving unit and between the amplifier and the second optical receiving unit.

One mode of the present invention is the above optical transmission system in which the carrier monitoring function unit further acquires the second optical signal, obtains an amount of frequency deviation of each carrier signal included in the second optical signal, and calculates a minimum optical sensitivity at the second optical receiving unit based on the amount of frequency deviation, and the output adjustment unit further updates the second predetermined value based on the minimum optical sensitivity at the second optical receiving unit calculated by the carrier monitoring function unit.

One mode of the present invention is the above optical transmission system further including a second multiplexer for multiplexing the first optical signal transmitted from the first optical transmitting unit and the second optical signal transmitted from the second optical transmitting unit, wherein the output adjustment unit acquires an optical signal multiplexed by the second multiplexer, demultiplexes the acquired optical signal into the first optical signal and the second optical signal, adjusts signal intensities of the demultiplexed first optical signal and second optical signal, and outputs the first optical signal and the second optical signal.

One mode of the present invention is the above optical transmission system in which the output adjustment unit calculates a first necessary signal intensity that is a signal intensity that the first optical signal included in the multiplexed signal output from the amplifier is required to have, based on the first predetermined value, insertion loss that occurs in the multiplexer, and transmission loss that occurs between the amplifier and the first optical receiving unit, calculates a second necessary signal intensity that is a signal intensity that the second optical signal included in the multiplexed signal output from the amplifier is required to have, based on the second predetermined value, insertion loss that occurs in the multiplexer, and transmission loss that occurs between the amplifier and the second optical receiving unit, calculates respective output signal intensities of the first optical signal and the second optical signal that are included in the multiplexed signal output from the amplifier so as to satisfy the first necessary signal intensity and the second necessary signal intensity, respectively, calculates respective input signal intensities of the first optical signal and the second optical signal that are included in the multiplexed signal input to the amplifier, the input signal intensities being required to achieve the calculated output signal intensities, and calculates respective adjustment amounts for the signal intensities of the acquired first optical signal and second optical signal, based on a result of measuring the signal intensities of the acquired first optical signal and second optical signal and the calculated respective input signal intensities.

One mode of the present invention is a carrier monitoring device that adjusts respective signal intensities of a first optical signal and a second optical signal that are included in a multiplexed signal input to an amplifier for amplifying the first optical signal and the second optical signal, the first optical signal being an optical signal having a first wavelength that is obtained as a result of first frequency-multiplexed multi-channel signals being converted by means of FM batch conversion and that is to be transmitted to a first optical receiving unit, the second optical signal being an optical signal having a second wavelength different from the first wavelength that is obtained as a result of second frequency-multiplexed multi-channel signals being converted by means of FM batch conversion and that is to be transmitted to a second optical receiving unit, the carrier monitoring device including: a first acquisition unit for acquiring the first optical signal; a second acquisition unit for acquiring the second optical signal; a first measurement unit for measuring a signal intensity of the first optical signal acquired by the first acquisition unit; a second measurement unit for measuring a signal intensity of the second optical signal acquired by the second acquisition unit; an adjustment amount calculation unit for calculating respective adjustment amounts for the signal intensity of the first optical signal acquired by the first acquisition unit and the signal intensity of the second optical signal acquired by the second acquisition unit, based on a measurement result of the measurement performed by the first measurement unit and a measurement result of the measurement performed by the second measurement unit, such that the signal intensity of the first optical signal received by the first optical receiving unit is larger than or equal to a first predetermined value, the signal intensity of the second optical signal received by the second optical receiving unit is larger than or equal to a second predetermined value, and a signal intensity of the multiplexed signal output from the amplifier is larger than or equal to a third predetermined value; a signal intensity adjustment unit for adjusting the signal intensity of the first optical signal acquired by the first acquisition unit and the signal intensity of the second optical signal acquired by the second acquisition unit based on the respective adjustment amounts calculated by the adjustment amount calculation unit, and outputting the first optical signal and the second optical signal that have been subjected to the signal intensity adjustment; and a carrier monitoring function unit for obtaining an amount of frequency deviation of each carrier signal included in the first optical signal or the second optical signal, calculating a minimum optical sensitivity at the first optical receiving unit or the second optical receiving unit based on the amount of frequency deviation, and updating the first predetermined value or the second predetermined value based on the minimum optical sensitivity.

Effects of the Invention

According to the present invention, a technique can be provided that enables viewing of the existing broadcasts and newly-added broadcasts even if broadcasts using a new carrier signal is added.

DESCRIPTION OF EMBODIMENTS

First Embodiment

Hereinafter, the first embodiment of the present invention will be described with reference to the drawings.

Figure 1:
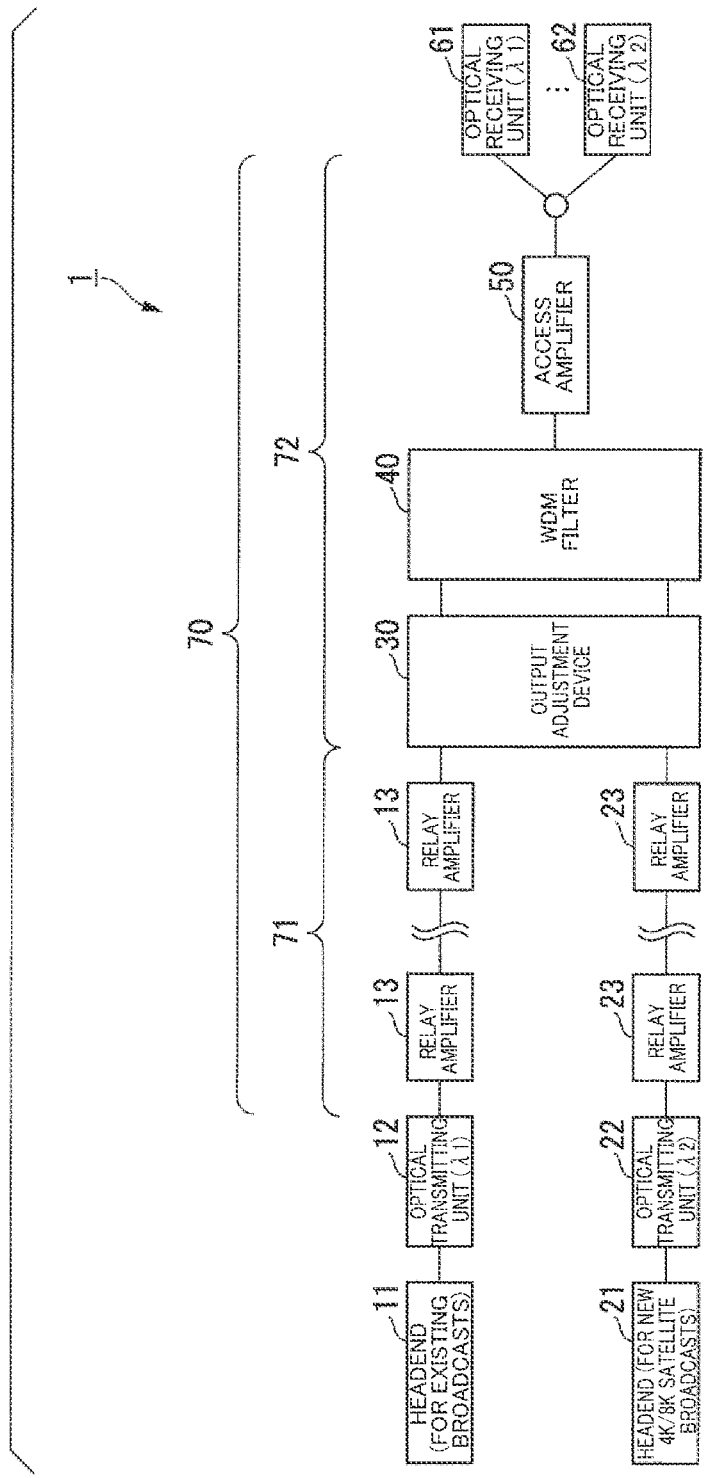
FIG. 1 is a block diagram showing a network configuration of an FTTH CATV system that supports the new 4K/8K satellite broadcasts according to a first embodiment of the present invention.

Network Configuration A description will be given below of a network configuration of an FTTH CATV system 1 that supports the new 4K/8K satellite broadcasts according to the first embodiment of the present invention. FIG. 1 is a block diagram showing an example of the network configuration. As shown in FIG. 1, the FTTH CATV system 1 (optical transmission system) includes a headend 11, an optical transmitting unit 12, and relay amplifiers 13 for the existing broadcasts, a headend 21, an optical transmitting unit 22, and relay amplifiers 23 that support the new 4K/8K satellite broadcasts, an output adjustment device 30, a WDM filter 40, an access amplifier 50, optical receiving units 61 for the existing broadcasts, and optical receiving units 62 that support the new 4K/8K satellite broadcasts.

The headend 11 receives a radio wave that carries a video signal for the existing broadcasts transmitted from a broadcasting station via a transmission tower on the ground, an artificial satellite, or the like, and adjusts, e.g. amplifies the received radio wave. Then, the headend 11 sends out an electrical signal based on the video signal to the optical transmitting unit 12. The optical transmitting unit 12 (first optical transmitting unit) converts the received electrical signal to an optical signal with a wavelength $\lambda 1$, and sends out this optical signal to an optical transmission path 70, which is constituted by an optical fiber.

The headend 21 receives a radio wave that carries a video signal for the new 4K/8K satellite broadcasts transmitted from a broadcasting station via a transmission tower on the ground, an artificial satellite, or the like, and adjusts, e.g. amplifies the received radio wave. Then, the headend 21 sends out an electrical signal based on the video signal to the optical transmitting unit 22. The optical transmitting unit 22 (second optical transmitting unit) converts the received electrical signal to an optical signal with a wavelength $\lambda 2$, and sends out this optical signal to an optical transmission path 70. Here, the wavelength $\lambda 1$ and the wavelength $\lambda 2$ are different wavelengths.

The optical transmission path 70 is divided into a section of a relay NW 71 and a section of an access NW 72. The relay NW 71 is a communication network that connects the optical transmitting unit 12 and the optical transmitting unit 22 to the access NW. In the relay NW 71, multiple relay amplifiers 13 for the existing broadcasts and multiple relay amplifiers 23 for the new 4K/8K satellite broadcasts are provided.

A relay amplifier 13 at the first stage receives input of the optical signal with the wavelength $\lambda 1$ sent out from the optical transmitting unit 12. Each of the relay amplifiers 13 sends out an amplified optical signal to another downstream relay amplifier 13 or to the output adjustment device 30 in the section of the access NW 72. A relay amplifier 23 at the first stage receives input of the optical signal with the wavelength $\lambda 2$ sent out from the optical transmitting unit 22. Each of the relay amplifiers 23 sends out an amplified optical signal to another downstream relay amplifier 23 or to the output adjustment device 30 in the section of the access NW 72.

Meanwhile, commonly, a PON configuration is applied to the access NW in order to distribute optical signals received from the relay amplifiers 13 and the relay amplifiers 23 to a plurality of subscribers' houses.

The output adjustment device 30 (output adjustment unit) acquires the optical signal with the wavelength $\lambda 1$ sent out from the relay amplifier 13, and the optical signal with the wavelength $\lambda 2$ sent out from the relay amplifier 23. The output adjustment device 30 adjusts the signal level (signal intensity) of the acquired optical signals as required, and outputs these optical signals at the adjusted output level to the WDM filter 40.

The WDM filter 40 (multiplexer) multiplexes the optical signal with the wavelength $\lambda 1$ and the optical signal with the wavelengths $\lambda 2$ that are output from the output adjustment device 30, and sends out the multiplexed signals to the access amplifier 50.

The access amplifier 50 is an amplifier that is installed for the purpose of, for example, compensating loss caused by distribution of optical signals due to the PON configuration. The access amplifier 50 amplifies the optical signal (multiplexed signals) sent out from the WDM filter 40. The access amplifier 50 then sends out the amplified optical signal to the optical receiving units 61 and the optical receiving units 62 via the PON, which is constructed on the downstream side of the access amplifier 50. The optical receiving units 61 and the optical receiving units 62 are installed at subscribers' houses, for example, and terminate the optical signals with the wavelength $\lambda 1$ and the wavelength $\lambda 2$, respectively.

The access amplifier 50 is an optical fiber amplifier, such as an EDFA (Erbium-doped Fiber Amplifier), for example. Even if optical signals with a plurality of wavelengths are input, this optical fiber amplifier can collectively amplify these optical signals as-is. Also, even if the input level of the optical signals input to the optical fiber amplifier varies, an optical fiber amplifier equipped with an APC (Automatic Power Control) function can perform control to maintain the output level of the optical signals at a constant level if the variation is within an allowable range. However, if an input optical signal is a multiplexed signal of a plurality of optical signals with different wavelengths, this APC function performs control to make the output level of this multiplexed signal constant. That is to say, if the input optical signal is a multiplexed signal of an optical signal with the wavelength λ1 and an optical signal with the wavelength λ2, the APC function is not configured to perform control to make each of the output level of the optical signal with the wavelength λ1 and the output level of the optical signal with the wavelength λ2 constant.

Each of the optical receiving units 61 (first optical receiving units) can receive the optical signal (first optical signal) with the wavelength λ1 (first wavelength) output from the relay amplifier 13 for the existing broadcasts. The optical receiving units 62 (second optical receiving units) can receive the optical signal (second optical signal) with the wavelength λ2 (second wavelength) output from the relay amplifier 23 that supports the new 4K/8K satellite broadcasts. Although FIG. 1 shows one optical receiving unit 61 and one optical receiving unit 62 for ease of viewing the diagram, in reality, at least one of the optical receiving unit 61 and the optical receiving unit 62 is installed at each of the plurality of subscribers' houses.

Overview of Output Adjustment Device

A description will be given below of an overview of the output adjustment device (carrier monitoring device) 30 in the FTTH CATV system 1 according to the first embodiment of the present invention. The output adjustment device 30 extracts carrier signals with respective predetermined frequencies by splitting a portion of the input optical signal with the wavelength λ2 and performing demodulation processing. The output adjustment device 30 calculates the amount of frequency deviation of each of the extracted carrier signals. Furthermore, the output adjustment device 30 calculates, using the above-calculated amount of frequency deviation, the minimum optical sensitivity that is required for each of the carrier signals included in the optical signal with the wavelength λ2 to be normally received by each optical receiving unit 62, in the case where conversion processing using the FM batch conversion method is applied.

The output adjustment device 30d regards the worst (largest) value of the calculated minimum optical sensitivities as a necessary minimum optical sensitivity for the optical signal with the wavelength λ2 at the optical receiving unit 62. Then, the output adjustment device 30d appropriately adjusts the signal level of the input optical signal with the wavelength λ2 such that the optical reception level of the optical signal with the wavelength λ2 at the optical receiving unit 62 installed satisfies the necessary minimum optical sensitivity, and outputs the optical signal with the wavelength λ2 to the WDM filter 40.

Here, if a new carrier signal is added to the optical signal with the wavelength λ2, there may be cases where the minimum optical sensitivity corresponding to the new carrier signal is a worse (larger) value than the necessary minimum optical sensitivity that has been applied thus far (i.e. at a point before the new carrier signal is added to the optical signal with the wavelength λ2). In such cases, the output adjustment device 30 updates the necessary minimum optical sensitivity with the value of the minimum optical sensitivity corresponding to the new carrier signal, and adjusts the signal level of optical signal with the wavelength λ2 so as to satisfy the updated necessary minimum optical sensitivity.

An example of a method for detecting that a new carrier signal has been added will be described below. First, information regarding the carrier signals (e.g. frequency and the like of each carrier signal) is registered, in advance, to the output adjustment device 30 by an external control terminal (not shown) or the like. If a carrier signal included in an input optical signal with the wavelength λ2 is received, the output adjustment device 30 compares information regarding the received carrier signal with the aforementioned information regarding the carrier signals that is registered in advance.

The output adjustment device 30 regards the received carrier signal as a new carrier signal in the following case. The aforementioned case refers to the case where information regarding the received carrier signal coincides with any piece of the information regarding the carrier signals that is registered in advance, and the output adjustment device 30 has never received the carrier signal received at this time. Note that it is desirable that the output adjustment device 30 determines that it has detected a carrier signal if the level of the received carrier signal is larger than or equal to a predetermined value, so that the output adjustment device 30 does not detect noise as a new carrier signal. Also, the output adjustment device 30 holds information regarding the new carrier signal. Thus, even if the same carrier signal is received again later, the output adjustment device 30 does not regard this carrier signal as a new carrier signal.

The output adjustment device 30 can detect a new carrier signal using the above method.

An optical signal whose signal level has been adjusted by the output adjustment device 30 is input to the access amplifier 50 via the WDM filter 40.

Here, it is assumed that the system is designed in advance such that the output levels of the optical signal with the wavelength λ1 and optical signal with the wavelength λ2 from the access amplifier 50 equipped with the APC function are appropriate output levels. Here, if the output level of the optical signal with the wavelength λ2 from the access amplifier 50 is increased in order to address the worsening of the necessary minimum optical sensitivity due to addition of a new carrier signal, necessarily, the output level of the optical signal with the wavelength λ1 becomes smaller than before the new carrier is added. For this reason, it is assumed that, to prepare for an increase in the output level of the optical signal with the wavelength λ2 due to worsening of the necessary minimum optical sensitivity, the output adjustment device 30 is designed in advance such that, even if the output level of the output signal with the wavelength λ1 becomes small to some extent, it does not affect distribution and viewing of the existing broadcasts.

Based on the above premise, the output adjustment device 30 monitors received carrier signals, detects a new carrier signal, and recognizes the minimum optical sensitivity for this carrier signal. Then, the output adjustment device 30 determines whether or not the necessary minimum optical sensitivity at the optical receiving unit 62 has worsened. Even if the necessary minimum optical sensitivity has worsened, the output adjustment device 30 controls the output levels of the optical signal with the wavelength λ1 and the output signal with the wavelength λ2 to be output from the access amplifier 50 as required such that the new carrier signal is normally received by the optical receiving unit 62.

Functional Configuration of Output Adjustment Device

Figure 2:
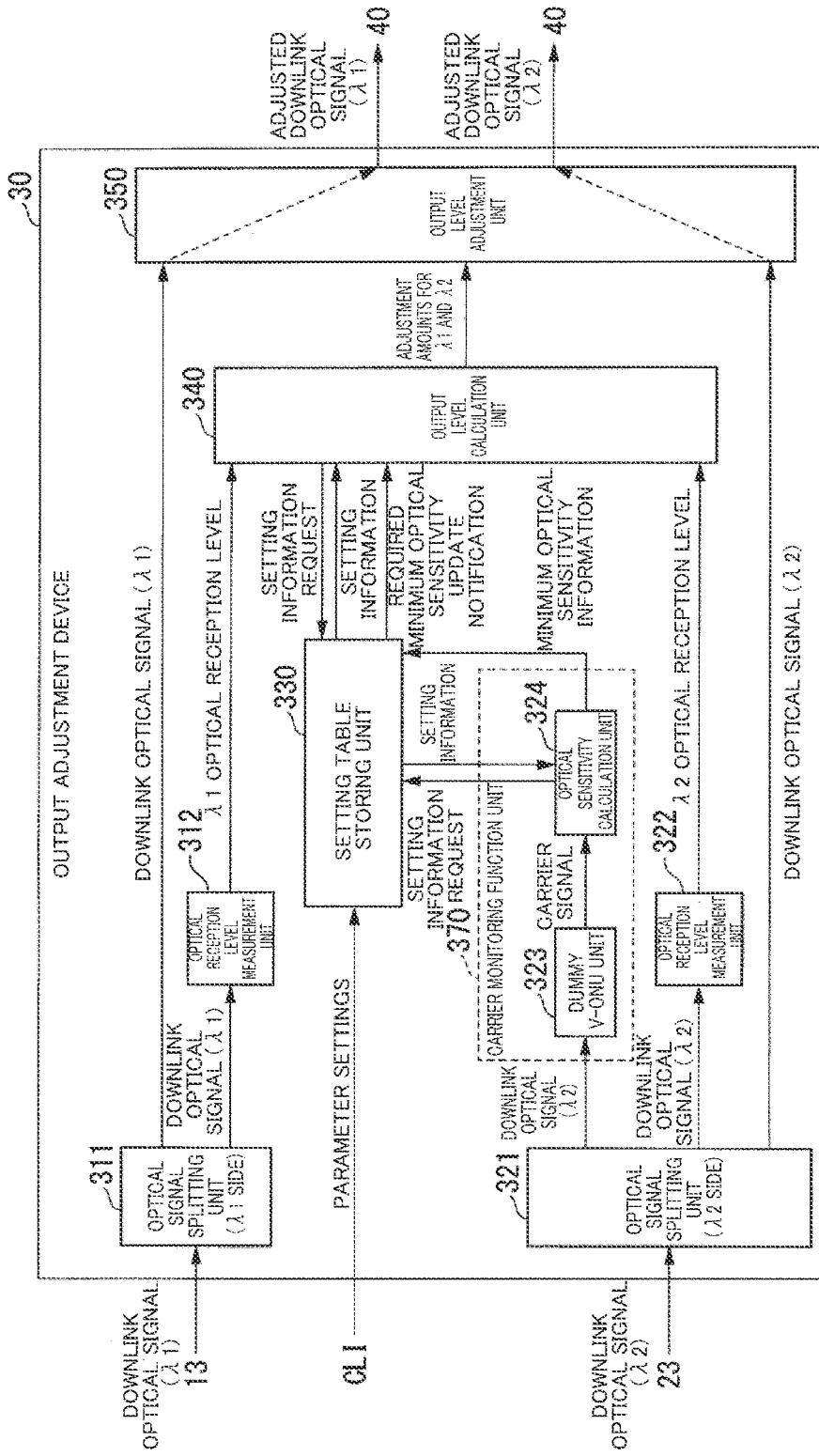
FIG. 2 is a block diagram showing a functional configuration of an output adjustment device according to the first embodiment of the present invention.

A functional configuration of the output adjustment device 30 will be described below. FIG. 2 is a block diagram showing the functional configuration of the output adjustment device 30. As shown in FIG. 2, the output adjustment device 30 includes an optical signal splitting unit 311 and an optical reception level measurement unit 312 for the existing broadcasts, an optical signal splitting unit 321 and an optical reception level measurement unit 322 for the new 4K/8K satellite broadcasts, a setting table storing unit 330, an output level calculation unit 340, an output level adjustment unit 350, and a carrier monitoring function unit 370. The carrier monitoring function unit 370 includes a dummy V-ONU unit 323, and an optical sensitivity calculation unit 324.

The optical signal splitting unit 311 (first acquisition unit) acquires an optical signal with the wavelength λ1 for the existing broadcasts that has been sent out from the relay amplifier 13. The optical signal splitting unit 311 outputs the acquired optical signal to the optical reception level measurement unit 312 and the output level adjustment unit 350. The optical signal splitting unit 311 includes an optical coupler, for example.

The optical reception level measurement unit 312 (first measurement unit) acquires the optical signal with the wavelength λ1 for the existing broadcasts that is output from the optical signal splitting unit 311. The optical reception level measurement unit 312 measures the optical reception level of the acquired optical signal. The optical reception level measurement unit 312 then outputs information indicating the measurement result to the output level calculation unit 340.

The optical signal splitting unit 321 (second acquisition unit) acquires an optical signal with the wavelength λ2 for the new 4K/8K satellite broadcasts that has been sent out from the relay amplifier 23. The optical signal splitting unit 321 outputs the acquired optical signal to the optical reception level measurement unit 322, the dummy V-ONU unit 323, and the output level adjustment unit 350. The optical signal splitting unit 321 includes an optical coupler, for example.

The optical reception level measurement unit 322 (second measurement unit) acquires the optical signal with the wavelength λ2 for the new 4K/8K satellite broadcasts that is output from the optical signal splitting unit 321. The optical reception level measurement unit 322 measures the optical reception level of the acquired optical signal. The optical reception level measurement unit 322 then outputs information indicating the measurement result to the output level calculation unit 340.

The dummy V-ONU unit 323 has a function corresponding to the optical receiving unit 62 that is installed in each subscriber's house. The dummy V-ONU unit 323 acquires the optical signal with the wavelength λ2 that is output from the optical signal splitting unit 321. The dummy V-ONU unit 323 converts the acquired optical signal to an electrical signal, and converts the electrical signal to a single-channel broadband FM signal by means of FM batch conversion. The dummy V-ONU unit 323 extracts carrier signals having respective predetermined frequencies by demodulating the FM signal. The dummy V-ONU unit 323 then outputs the extracted carrier signals to the optical sensitivity calculation unit 324.

The optical sensitivity calculation unit 324 acquires the carrier signals output from the dummy V-ONU unit 323. The optical sensitivity calculation unit 324 also acquires parameter values that are set in a later-described first setting table, which is stored in the setting table storing unit 330. The optical sensitivity calculation unit 324 calculates the amount of frequency deviation of each of the carrier signals using the parameter values. Furthermore, the optical sensitivity calculation unit 324 calculates the minimum optical sensitivity for each of the carrier signals at the optical receiving unit 62, using the calculated amount of frequency deviation. The optical sensitivity calculation unit 324 outputs, to the setting table storing unit 330, information (minimum optical sensitivity information) indicating the worst (largest) value out of the calculated values of the minimum optical sensitivity for the carrier signals.

Thus, even if a new carrier is added with a start of a new broadcast or the like, the optical sensitivity calculation unit 324 constantly and regularly, or irregularly, monitors carrier signals and calculates the minimum optical sensitivity or the like, and can thus detect a new carrier signal. Then, the optical sensitivity calculation unit 324 can calculate the minimum optical sensitivity corresponding to the new carrier signal, and update a later-described second setting table, which is stored in the setting table storing unit 330.

Note that the amount of frequency deviation and the minimum optical sensitivity can be calculated based on a calculation formula that is defined in NPL 1. The amount of frequency deviation and the minimum optical sensitivity need not be constantly calculated, and may be calculated regularly or irregularly. Also, the minimum optical sensitivity information may be output to the setting table storing unit 330 only when the minimum optical sensitivity is calculated for the first time and when a calculated value of the minimum optical sensitivity differs from (is larger than) the previously-calculated value.

The setting table storing unit 330 stores the first setting table and the second setting table. The setting table storing unit 330 is constituted by, for example, a storage medium such as a RAM (Random Access Memory), a flash memory, an EEPROM (Electrically Erasable Programmable Read Only Memory), or an HDD (Hard Disk Drive), or any combination of these storage media.

In the first setting table, parameter values of various parameters required to calculate the amount of frequency deviation and the minimum optical sensitivity are set in advance. These parameter values are output to the optical sensitivity calculation unit 324 in accordance with a request from the optical sensitivity calculation unit 324.

In the second setting table, parameter values of various parameters required to adjust the output level (calculation and determination of the adjustment amount) are set. Note that the parameters that are set in the second setting table include the following parameters (A) to (E), for example.

(A) The output level of the optical signal (multiplexed signal) on the specifications or the output level on the settings at the access amplifier 50 (third predetermined value).

(B) The minimum optical sensitivity for the optical signal with the wavelength λ1 at the optical receiving unit 61 (first predetermined value) and the minimum optical sensitivity for the optical signal with the wavelength λ2 at the optical receiving unit 62 (second predetermined value).

(C) Transmission loss of the optical signal with the wavelength λ1 during optical fiber transmission between the access amplifier 50 and the optical receiving unit 61, and transmission loss of the optical signal with the wavelength λ2 during optical fiber transmission between the access amplifier 50 and the optical receiving unit 62.

(D) Insertion loss of the optical signal with the wavelength λ1 and the insertion loss of the optical signal with the wavelength λ2 at the WDM filter 40.

(E) Splitting loss of the optical signal with the wavelength λ1 at the optical signal splitting unit 311, and splitting loss of the optical signal with the wavelength λ2 at the optical signal splitting unit 321.

The setting table storing unit 330d updates a parameter value of the parameter (B) in the following case. Here, the aforementioned case refers to the case where the value of the minimum optical sensitivity indicated by the minimum optical sensitivity information output from the optical sensitivity calculation unit 324 is a worse (larger) value than the value indicating the minimum optical sensitivity for the optical signal with the wavelength λ2, of the parameter values of the aforementioned parameter (B) that are set in the second setting table.

Note that, if the parameter value of the parameter (B) is thus updated, the setting table storing unit 330d may output, to the output level calculation unit 340d, information (necessary minimum optical sensitivity update notification) indicating that the parameter value has been updated. Here, this configuration does not depend on whether or not a request for setting information has been given from the output level calculation unit 340. Thus, the output level calculation unit 340d can promptly recognize that the parameter value of the parameter (B) has been updated, and promptly recalculate the adjustment amount for the output level of the optical signal.

The parameters (A) to (E) set in the second setting table are parameters that are mainly required to adjust the output level of the optical signals, as mentioned above. Meanwhile, the parameters set in the first setting table are parameters that are required to calculate the amount of frequency deviation and the minimum optical sensitivity, as mentioned above. The parameters set in the first setting table are, for example, the value of the input level of a carrier signal input to the optical transmitting unit 22 on the wavelength-λ2 optical signal side, the values of the optical modulation degree or the like of an FM batch conversion signal, and the like. Note that the method for calculating these parameters to be set in the first setting table may be the method defined in NPL 1.

Note that a description will be given below of a configuration for setting, in advance, the parameter values of various parameters for the first setting table and the second setting table stored in the setting table storing unit 330. For example, this configuration may be such that an external control device (not shown) is connected to the output adjustment device 30 via a control interface (not shown), and settings are configured by a CLI (Command Line Interface) via this external control device. Alternatively, this configuration may be such that, for example, a control frame for giving an instruction to set the parameter values to the first setting table and the second setting table is defined in advance, and the settings are configured due to the control frame being transmitted from a host network device to the output adjustment device 30 via a transmission path. However, of the parameter values of the parameter (B) set in the second setting table, the value of the minimum optical sensitivity for the optical signal with the wavelength λ2 may be updated in accordance with the minimum optical sensitivity information output from the optical sensitivity calculation unit 324, as mentioned above.

A configuration may be employed in which this update is performed not only when the value of the minimum optical sensitivity based on the minimum optical sensitivity information is a worse (larger) value than the value of the minimum optical sensitivity set in the second setting table, but the update is also performed (i.e. a new value is set) when no value of the minimum optical sensitivity is set in the second setting table.

Note that, since the present embodiment envisions an FTTH CATV system that uses optical signals with two types of wavelengths (wavelength λ1 and wavelength λ2), the parameter values of the parameters (B) to (E) for the optical signal with the wavelength λ1 and the optical signal with the wavelength λ2 are set in the second setting table. Thus, in the case of an FTTH CATV system that uses optical signals with three or more types of wavelengths, it is desirable that the parameter values for these optical signals with three types of wavelengths are set in the second setting table.

The output level calculation unit 340 (adjustment amount calculation unit) acquires information that is output from the optical reception level measurement unit 312 and indicates the result of measuring the optical reception level of the optical signal with the wavelength λ1 for the existing broadcasts. The output level calculation unit 340 also acquires information that is output from the optical reception level measurement unit 322 and indicates the result of measuring the optical reception level of the optical signal with the wavelength λ2 for the new 4K/8K satellite broadcasts. The output level calculation unit 340 also acquires the parameter values set in the second setting table stored in the setting table storing unit 330.

The output level calculation unit 340 then calculates the adjustment amount for the output level of the optical signal with the wavelength λ1 and the adjustment amount for the output level of the optical signal with the wavelength λ2, based on the information indicating the measurement result acquired from the optical reception level measurement unit 312, the information indicating the measurement result acquired from the optical reception level measurement unit 322, and the parameter values acquired from the setting table storing unit 330. Note that the method for calculating these adjustment amounts will be described later. The output level calculation unit 340 outputs, to the output level adjustment unit 350, information indicating the results of calculating the adjustment amounts for the output levels of the optical signal with the wavelength λ1 and the optical signal with the wavelength λ2.

The output level adjustment unit 350 (signal intensity adjustment unit) acquires information that is output from the output level calculation unit 340 and indicates the results of calculating the adjustment amounts for the output levels of the optical signal with the wavelength λ1 and the optical signal with the wavelength λ2. Thus, the output level adjustment unit 350 recognizes the adjustment amount for the output level of the optical signal with the wavelength λ1 and the adjustment amount for the output level of the optical signal with the wavelength λ2.

The output level adjustment unit 350 also acquires the optical signal with the wavelength λ1 for the existing broadcasts that is output from the optical signal splitting unit 311, and outputs the acquired optical signal to the WDM filter 40. Here, the output level adjustment unit 350 adjusts the output level of the optical signal with the wavelength λ1 to be output to the WDM filter 40 so as to amplify or attenuate the output level in accordance with the above-recognized adjustment amount. The output level adjustment unit 350 also acquires the optical signal with the wavelength λ2 for the new 4K/8K satellite broadcasts that is output from the optical signal splitting unit 321, and outputs the acquired optical signal to the WDM filter 40. Here, the output level adjustment unit 350 adjusts the output level of the optical signal with the wavelength λ2 to be output to the WDM filter 40 so as to amplify or attenuate the output level in accordance with the above-recognized adjustment amount.

Note that if the necessary minimum optical sensitivity for the optical signal with the wavelength λ2 (the parameter value of the parameter (B)) is updated in accordance with the output of the minimum optical sensitivity information from the optical sensitivity calculation unit 324 to the setting table storing unit 330, it is desirable that the output level calculation unit 340 promptly recalculates the adjustment amount.

Therefore, as mentioned above, the setting table storing unit 330 may output, to the output level calculation unit 340, information indicating that the necessary minimum optical sensitivity has been updated (necessary minimum optical sensitivity update notification), regardless of whether or not a request for setting information is given from the output level calculation unit 340.

Alternatively, the output level calculation unit 340 may regularly request the setting table storing unit 330 to output setting information, and the setting table storing unit 330 may output setting information to the output level calculation unit 340 when necessary, or only at the time of update. In this case, the shorter the time interval of the request to output setting information given from the output level calculation unit 340 to the setting table storing unit 330 is, the more promptly the output level calculation unit 340 can recognize an update of the necessary minimum optical sensitivity.

With the above configuration, if the output level calculation unit 340 recognizes an update of the necessary minimum optical sensitivity, the output level calculation unit 340 recalculates the adjustment amounts from a step 1 described in the first embodiment. In this case, however, an updated value is used as the value of the minimum optical sensitivity corresponding to the optical signal with the wavelength $\lambda 2$, of the parameter values used in the calculation in the step 1.

Procedure for Calculating Adjustment Amounts

A description will be given below of an example of a procedure for calculating the adjustment amounts for the output levels of the optical signals that is performed by the output level calculation unit 340. The output level calculation unit 340 performs calculation in accordance with the following steps 1 to 4.

Step 1: Calculation of the Necessary Output Level for Each Wavelength for the Output from the Access Amplifier 50

The output level calculation unit 340 calculates the necessary output level of the optical signal with the wavelength $\lambda 1$ (first necessary signal intensity) at the access amplifier 50. Here, the necessary output level is necessary for the optical reception level of the optical signal with the wavelength $\lambda 1$ at the optical receiving unit 61 to be larger than or equal to the minimum optical sensitivity for the optical signal with the wavelength $\lambda 1$ at the optical receiving unit 61. Also, the output level calculation unit 340 calculates the necessary output level of the optical signal with the wavelength $\lambda 2$ (second necessary signal intensity) at the access amplifier 50. Here, the necessary output level is necessary for the optical reception level of the optical signal with the wavelength $\lambda 2$ at the optical receiving unit 62 to be larger than or equal to the minimum optical sensitivity for the optical signal with the wavelength $\lambda 2$ at the optical receiving unit 62. At this time, the output level calculation unit 340 calculates the necessary output levels based on the parameter values of the parameters (B) and (C) that are set in the setting table, while giving consideration to the minimum optical sensitivity at the respective optical receiving units (the optical receiving unit 61 and the optical receiving unit 62) and transmission loss corresponding to the distances between the access amplifier 50 and the respective optical receiving units.

Step 2: Determination of the Output Level for Each Wavelength for the Output from the Access Amplifier 50 As will be described next, the output level calculation unit 340 determines the output level (which is denoted as "X [mW]" here) of the optical signal with the wavelength $\lambda 2$ and the output level (which is denoted as "Y [mW]" here) of the optical signal with the wavelength $\lambda 1$ at the access amplifier 50. Here, the sum of the output level of the optical signal with the wavelength $\lambda 1$ and the output level of the optical signal with the wavelength $\lambda 2$, that is, the output level of the optical signal (multiplexed signal) to be output from the access amplifier 50 is made equal to the parameter value (which is denoted as "Z [mW (milliwatt)]" here) of the parameter (A) that is set in the setting table. That is to say, Z=X+Y holds. At this time, the output level calculation unit 340 determines the respective output levels (output signal intensities) so as to satisfy the following condition. Here, the aforementioned conditions refers to a condition that the output level of the optical signal with the wavelength $\lambda 1$ is larger than or equal to the necessary output level of the optical signal with the wavelength $\lambda 1$ calculated in the above step 1, and the output level of the optical signal with the wavelength $\lambda 2$ is larger than or equal to the necessary output level of the optical signal with the wavelength $\lambda 2$ calculated in the above step 1.

Note that there may be countless combinations of the values of X and Y that satisfy the above condition. For example, the following method may be used as the method for determining the combination of the values of X and Y to be used. In this method, the values of X and Y are determined such that the ratio between the necessary output level (which is denoted as "X' [mW]" here) of the optical signal with the wavelength $\lambda 1$ and the necessary output level (which is denoted as "Y' [mW]" here) of the optical signal with the wavelength $\lambda 2$ that are calculated in the step 1 matches the ratio between the Values of X and Y. Specifically, the Values of X and Y are determined by the following formula (1).

$$X = Z \times (X'/(X'+Y'))$$

$$Y = Z \times (Y'/(X'+Y')) \tag{1}$$

Alternatively, the following method is another example of the method for determining the combination of the values of X and Y to be used. In this method, the value of Y is denoted as Y', which indicates the necessary output level of the optical signal with the wavelength $\lambda 2$, and the value of X is determined to be a value calculated with an equation: X=Z−Y'. In the latter determination method, only a minimum output level (i.e. necessary output level) is assigned to the output level of the optical signal with the wavelength $\lambda 2$, and therefore a relatively larger output level is assigned to the output level of the optical signal with the wavelength $\lambda 1$.

Figure 11:
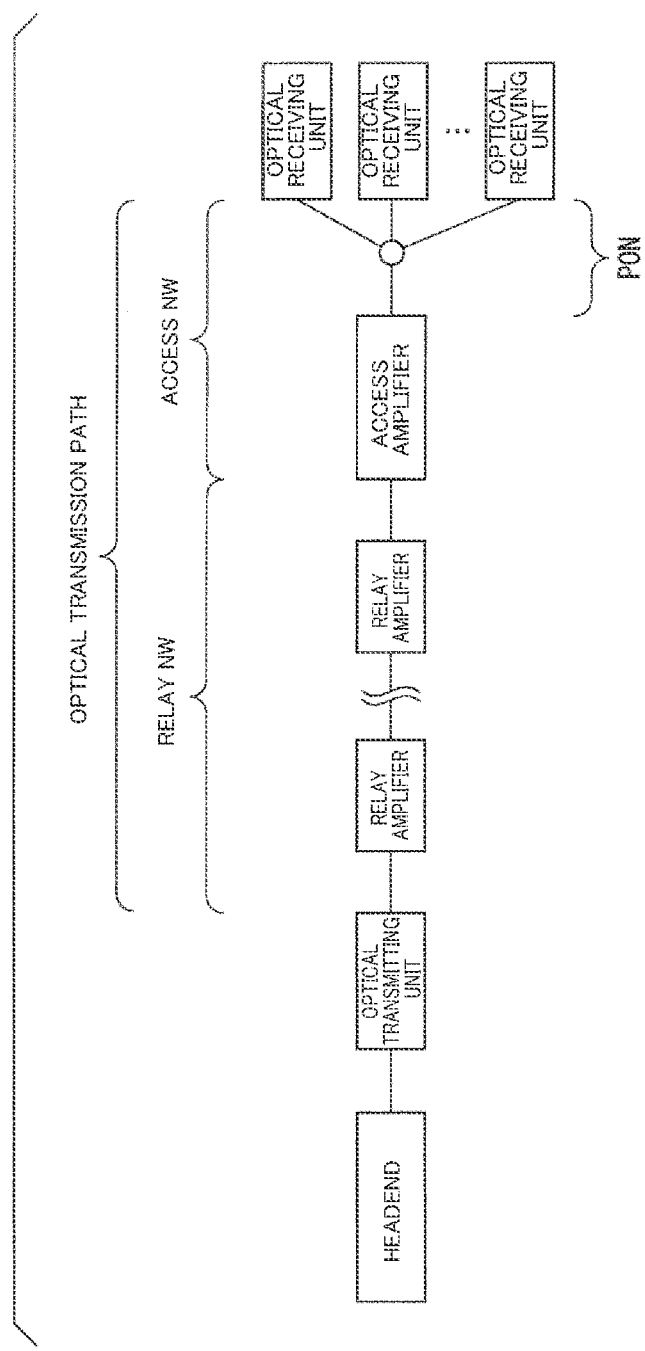
FIG. 11 is a block diagram showing an example of a network configuration of a conventional FTTH CATV system.

Since the optical signal with the wavelength $\lambda 2$ is input in the network configuration (FIG. 1) according to the present embodiment as mentioned above, the output level corresponding to the optical signal with the wavelength $\lambda 1$ in the output level of the multiplexed signal output from the access amplifier 50 necessarily decreases compared with the case of the conventional network configuration (FIG. 11). As a result, for example, when the conventional network configuration is extended to the network configuration according to the present embodiment (i.e. when the network configuration is modified to support the new 4K/8K satellite broadcasts), there may be viewers who can no longer watch the existing broadcasts that have been watchable with the conventional network configuration. Note that a larger number of such viewers occurs among the viewers at remote places that are particularly affected by signal attenuation. In order to minimize the occurrence of such viewers, it is necessary to make the output level corresponding to the optical signal with the wavelength $\lambda 1$ larger (i.e., closer to the value of the output level of the multiplexed signal) in the output level of the multiplexed signal output from the access amplifier 50. Accordingly, it can be said that the latter determination method is effective for minimizing the occurrence of the aforementioned viewers.

Step 3: Determination of the Input Level for Each Wavelength for the Input to the Access Amplifier 50

The output level calculation unit 340 determines the input levels of the optical signal with the wavelength λ1 and the optical signal with the wavelength λ2 that are included in the multiplexed signal to be input to the access amplifier 50. At this time, the output level calculation unit 340 determines the input levels (input signal intensities) of the optical signal with the wavelength λ1 and the optical signal with the wavelength λ2 to be input to the access amplifier 50. Here, the determination is made such that the output levels of the optical signal with the wavelength λ1 and the optical signal with the wavelength λ2 to be output from the access amplifier 50 take the values of X and Y, respectively, that are determined by the above step 2. Here, when the input levels of the optical signal with the wavelength λ1 and the optical signal with the wavelength λ2 to be input to the access amplifier 50 are denoted as x [mW] and y [mW], respectively, the output level calculation unit 340 may determine the values of x and y so as to satisfy the following formula (2), for example.

$$X:Y=x:y \quad (2)$$

Thus, the output level calculation unit 340 can control the output levels of the optical signal with the wavelength λ1 and the optical signal with the wavelength λ2 to be output from the access amplifier 50 to desired values of X and Y. Here, the aforementioned control is performed by the output level calculation unit 340 controlling the ratio between the output level of the optical signal with the wavelength λ1 and the output level of the optical signal with the wavelength λ2 such that this ratio matches the ratio between the input level of the optical signal with the wavelength λ1 and the input level of the optical signal with the wavelength λ2.

Note that there may be countless combinations of the values of x and y that satisfy the above condition. However, regardless of the combination of the values of x and y to be used, no problem will occur as long as the sum of the value of x and the value of y satisfies permissible values on the specifications (or settings) of the access amplifier 50. This is because, of the output level of the optical signal (multiplexed signal) output from the access amplifier 50, the output level corresponding to the optical signal with the wavelength λ1 takes the value of X determined by the step 2, and the output level of the optical signal with the wavelength λ2 takes the value of Y determined by the step 2. However, it is desirable that a combination of the values of x and y is used with which adjustment processing at the output level adjustment unit 350 can be performed more readily. The reason is that, in a later-described step 4, processing for adjusting the input levels of the acquired optical signal with the wavelength λ1 and optical signal with the wavelength λ2 acquired such that the input levels takes the values of x and y, respectively, that are determined in the step 3.

Specifically, adjustment processing using amplification or attenuation of received optical signals can be used as the adjustment processing, but if adjustment using amplification is required, it is necessary to equip the output adjustment device 30 with an amplification function whose device configuration is generally relatively more complex than an attenuation function. Accordingly, it is desirable to use a combination of the values of x and y that enables the above adjustment processing to be performed only using signal attenuation.

Note that, for example, the following method can be used as a specific method for determining a combination of the values of x and y that enables the above adjustment processing to be performed only using signal attenuation. In this method, the determination is made such that a condition is satisfied that the sum (X+Y) of the output level X of the optical signal with the wavelength λ1 and the output level Y of the optical signal with the wavelength λ2 is a parameter value Z of the parameter (A) that is set in the aforementioned setting table, and such that the value of x+y takes the minimum value of the input level on the specifications at the access amplifier 50.

By using the above-described adjustment method, it is more likely that the output levels of the optical signals with the wavelength λ1 and the wavelength λ2 can be adjusted by only using the attenuation function, and thus, the device configuration of the output adjustment device 30 can be readily prevented from becoming more complex.

Step 4: Calculation of the Adjustment Amounts

The output level calculation unit 340 calculates the adjustment amount for the signal level of the optical signal with the wavelength λ1 and the adjustment amount for the signal level of the optical signal with the wavelength λ2. These two adjustment amounts are required in order to make the input levels of the optical signal with the wavelength λ1 and the optical signal with the wavelength λ2 to be input to the access amplifier 50 equal, respectively, to the value of x and the value of y determined in the above step 3. Here, the output level calculation unit 340 calculates the adjustment amounts using the value of the optical reception level of the optical signal with the wavelength λ1 acquired from the optical reception level measurement unit 312, the value of the optical reception level of the wavelength λ2 acquired from the optical reception level measurement unit 322, and the parameter values of the aforementioned parameters (D) and (E) acquired from the setting table storing unit 330. The output level calculation unit 340 outputs, to the output level adjustment unit 350, information indicating the adjustment amount for the signal level of the optical signal with the wavelength λ1 and the adjustment amount for the signal level of the optical signal with the wavelength λ2 that are calculated above.

With the above-described steps 1 to 4, the output level calculation unit 340 can calculate the adjustment amount that is to be applied to the optical signal with the wavelength λ1 to be input to the output level adjustment unit 350 via the optical signal splitting unit 311, and the adjustment amount that is to be applied to the optical signal with the wavelength λ2 to be input to the output level adjustment unit 350 via the optical signal splitting unit 321.

Note that the present embodiment envisions a configuration in which the optical signals with the wavelength λ1 and the wavelength λ2 for broadcasts are continuously transmitted from the optical transmitting unit 12 and the optical transmitting unit 22 to the FTTH CATV system 1. However, the optical reception level of the optical signal with the wavelength λ1 and the optical reception level of the optical signal with the wavelength λ2 at the output adjustment device 30 are not always constant and, in general, at least minute variations in the optical reception level occur constantly. Recalculating the adjustment amounts and controlling the adjustment processing performed by the output level adjustment unit 350 so as to follow such a minute variation every time the variation occurs is not realistic from the viewpoint of loads or the like in the output adjustment device 30.

For example, it is assumed that the values of the optical reception level of the optical signal with the wavelength λ1 and the optical reception level of the optical signal with the wavelength λ2 that are obtained respectively from the optical reception level measurement unit 312 and the optical reception level measurement unit 322 are minutely varying. At this time, the output level calculation unit 340 may regard some degree of variations as being within the margin of error and allow it, and continue the adjustment based on the adjustment amounts that have been applied thus far (e.g. before the variation occurred).

Specifically, first, the value of the variation amount to serve as an allowable range is set in advance in the setting table storing unit 330 or a storage medium (not shown) or the like that is provided in the output level calculation unit 340, for example. For example, a value of ±ΔP [mW] is set in advance as the allowable range. Next, the output level calculation unit 340 calculates the adjustment amounts while using, as reference levels, the optical reception level (which is denoted as "P1 [mW]" here) of the optical signal with the wavelength λ1 and the optical reception level (which is denoted as "P2 [mW]") of the optical signal with the wavelength λ2 that are notified first from the optical reception level measurement unit 312 and the optical reception level measurement unit 322. Then, the output level calculation unit 340 regards a variation in the optical reception level regarding the wavelengths as being an allowable variation as long as the variation is within the respective ranges that satisfy "P1±ΔP" and "P2±ΔP", and does not perform the aforementioned processing for calculating the adjustment amounts. Only if a variation in the optical reception level exceeds the allowable range, the output level calculation unit 340 may update the reference level with the value of the optical reception level at this point (i.e. updates the aforementioned values of P1 and P2), and recalculate the adjustment amounts using the updated values of the optical reception levels.

As described above, with the output adjustment device 30 according to the present embodiment, the signal levels are appropriately adjusted for each of the input optical signals with the wavelength λ1 and the wavelength λ2, and then these optical signals are output. The optical signals at the signal levels that are the aforementioned combination of the desired values of x and y are input to the access amplifier 50. Since the optical signals are input to the access amplifier 50 at the signal levels corresponding to this combination of the values of x and y, the optical signal with the wavelength λ1 and the optical signal with the wavelength λ2 are output from the access amplifier 50 at the respective output levels that take the aforementioned desired values of X and Y. As a result, with the output adjustment device 30 according to the present embodiment, the optical signal with the wavelength λ1 and the optical signal with the wavelength λ2 are reliably transmitted at the signal levels with which the optical receiving units in subscribers' houses in a desired distribution area can receive the optical signals. Therefore, the output adjustment device 30 according to the present embodiment enables viewers to watch both the existing broadcasts and the new 4K/8K satellite broadcasts.

In addition, even in the following case, the output adjustment device 30 according to the present embodiment can calculate a worsened value of the necessary minimum optical sensitivity, and adjust the signal levels of the optical signal with the wavelength λ1 and the optical signal with the wavelength λ2 to be output from the access amplifier 50 such that these signal levels are appropriate for the optical receiving units 61 and the optical receiving units 62. In the aforementioned case refers to the case where, after the output adjustment device 30 has been introduced, for example, a distributed program that uses a new carrier signal is newly added to the new 4K/8K satellite broadcasts, and the necessary minimum optical sensitivity at the optical receiving units 62 worsens due to this addition. Thus, with the output adjustment device 30 according to the present embodiment, even if a distributed program that uses a new carrier signal is added, the optical signal with the wavelength λ1 and the optical signal with the wavelength λ2 are reliably received by the optical receiving units 61 and the optical receiving units 62 at the subscribers' houses in a desired distribution area, and the viewers can watch the existing broadcasts and the newly-added broadcasts.

Second Embodiment

The second embodiment of the present invention will be described below.

When a new broadcast using a frequency that is not used in the existing broadcasts is started, it is expected that the date and time of the start of the new broadcast will be widely notified in advance by, for example, the Ministry of Affairs and Communications in this country. Accordingly, it is considered that a situation is unlikely to occur that a video signal of a new carrier that is not used in the existing broadcasts suddenly starts to be input to the optical transmitting units in subscribers' houses. Accordingly, it is considered that the carrier monitoring function unit 370 of the output adjustment device 30 according to the above-described first embodiment need not be constantly activated.

For the above reason, it can be said that it is desirable, from the viewpoint of system loads or the like applied to the output adjustment device 30, to activate the carrier monitoring function unit 370 only when a new broadcast using a frequency that is not used in the existing broadcasts is started, and deactivate the carrier monitoring function unit 370 again after completing processing for calculating the minimum optical sensitivity and the like performed by the carrier monitoring function unit 370.

A carrier monitoring function unit 370b (carrier monitoring device) of an output adjustment device 30b according to the second embodiment has a configuration capable of switching ON and OFF the carrier monitoring function (i.e. the functions that the dummy V-ONU unit 323 and the optical sensitivity calculation unit 324 have).

Figure 3:
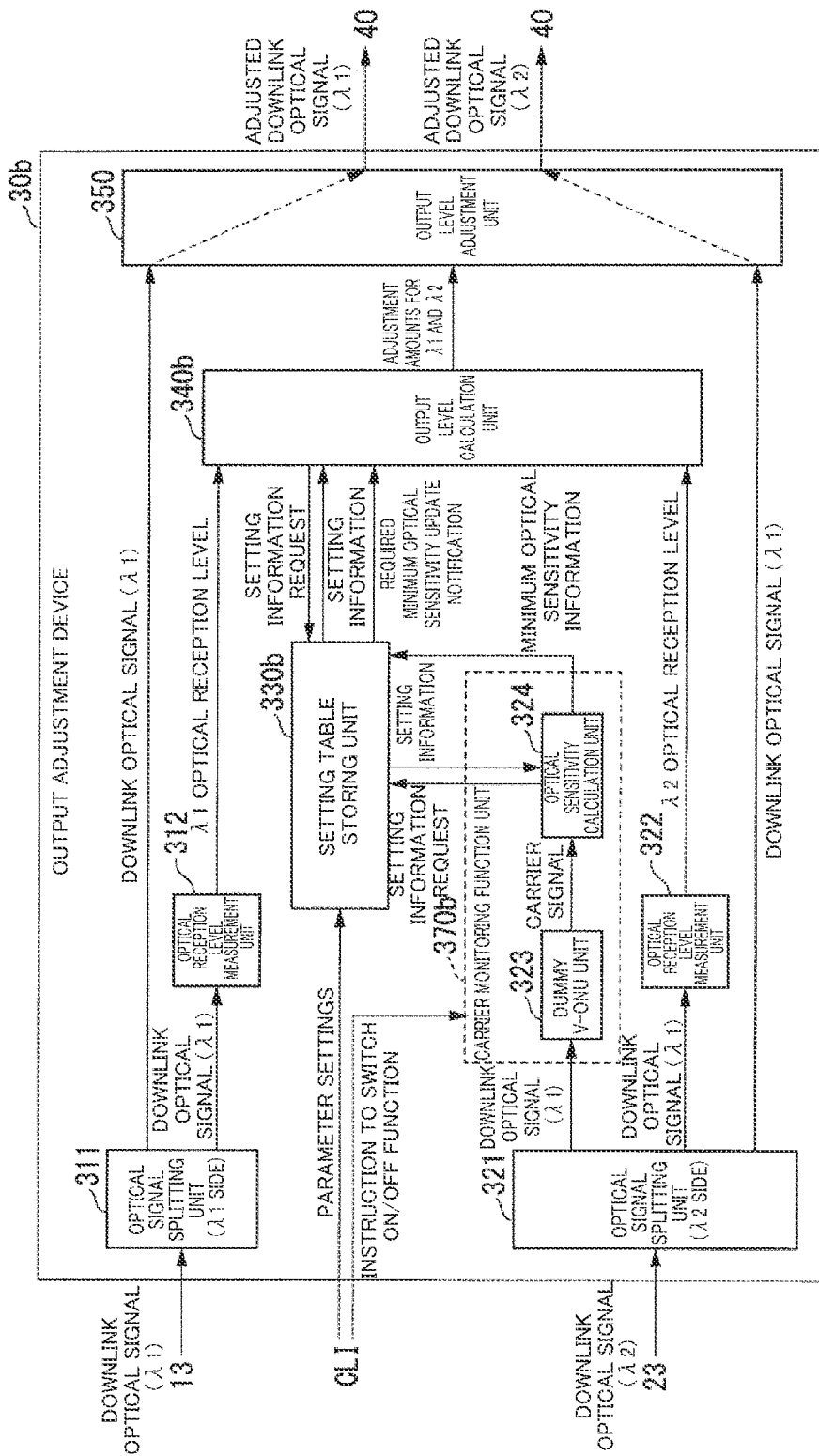
FIG. 3 is a block diagram showing a functional configuration of an output adjustment device according to a second embodiment of the present invention.

FIG. 3 is a block diagram showing a functional configuration of the output adjustment device 30b according to the second embodiment of the present invention. As shown in FIG. 3, the carrier monitoring function unit 370b switches ON and OFF its own carrier monitoring function based on instruction information that is input by a CLI. If the input instruction information is instruction information indicating an instruction to turn OFF the carrier monitoring function, the carrier monitoring function unit 370b stops activating the functions that the dummy V-ONU unit 323 and the optical sensitivity calculation unit 324 have. On the other hand, if the input instruction information is instruction information indicating an instruction to turn ON the carrier monitoring function, the carrier monitoring function unit 370b activates the functions that the dummy V-ONU unit 323 and the optical sensitivity calculation unit 324 have.

Figure 4:
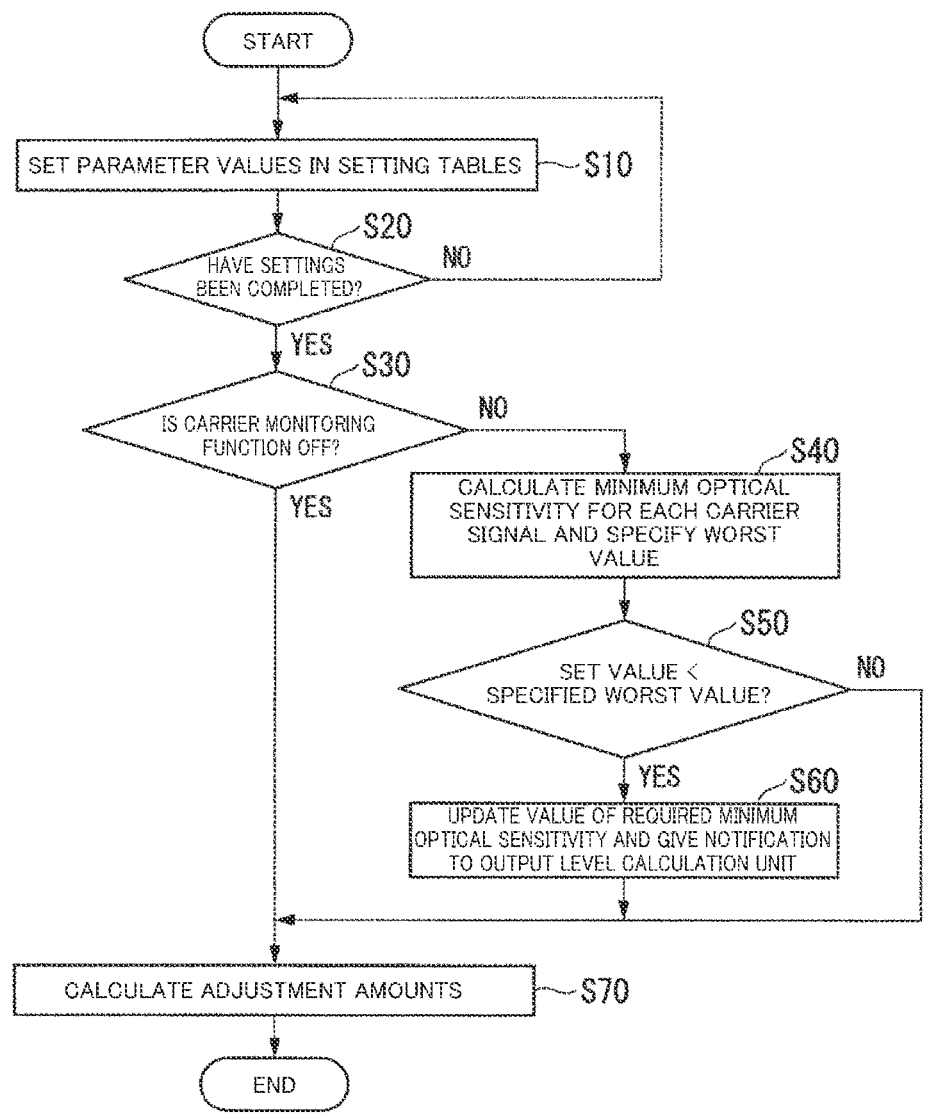
FIG. 4 is a flowchart showing processing for calculating adjustment amounts for signal levels of optical signals according to the second embodiment of the present invention.

FIG. 4 is a flowchart showing processing for calculating the adjustment amounts for the signal levels of the optical signals according to the second embodiment of the present invention. First, the parameter values of the parameters are set for the setting tables (the first setting table and the second setting table) by an external control terminal (not shown) or the like (step S10). After the settings have been completed (step S20; Yes), if the activation state of the carrier monitoring function is OFF (step S30; Yes), the output level calculation unit 340b performs processing for calculating the adjustment amounts (step S70).

On the other hand, after the setting has been completed (step 320; Yes), if the activation state of the carrier monitoring function is ON (step S30; No), the carrier monitoring function unit 370b calculates the minimum optical sensitivity for each carrier signal, and specifies the worst value, of the calculated values of the minimum optical sensitivity (step S40). If the value of the necessary minimum optical sensitivity that is already set as the parameter value of the parameter (B) in the second setting table is larger than or equal to the above-specified worst value (step S50; No), the output level calculation unit 340b performs processing for calculating the adjustment amounts (step S70).

On the other hand, if the value of the necessary minimum optical sensitivity that is already set as the parameter value of the parameter (B) in the second setting table is smaller than the above-specified worst value (step S50; Yes), the carrier monitoring function unit 370b updates the value of the necessary minimum optical sensitivity set in the second setting table. Thus, the setting table storing unit 330b notifies the output level calculation unit 340b of the update of the necessary minimum optical sensitivity (step S60). Then, the output level calculation unit 340b performs processing for calculating the adjustment amounts (step 370).

Note that, if the carrier monitoring function is switched ON based on processing shown in the flowchart in FIG. 4, it is desirable that the carrier monitoring function is switched OFF again by a CLI or the like after completing processing for calculating the adjustment amounts.

Third Embodiment

The third embodiment of the present invention will be described below.

The above-described second embodiment envisions that the carrier monitoring function is switched OFF by a CLI or the like, but the switching of the carrier monitoring function to the OFF state may be automatically performed by an output level calculation unit (an output level calculation unit 340c).

Figure 5:
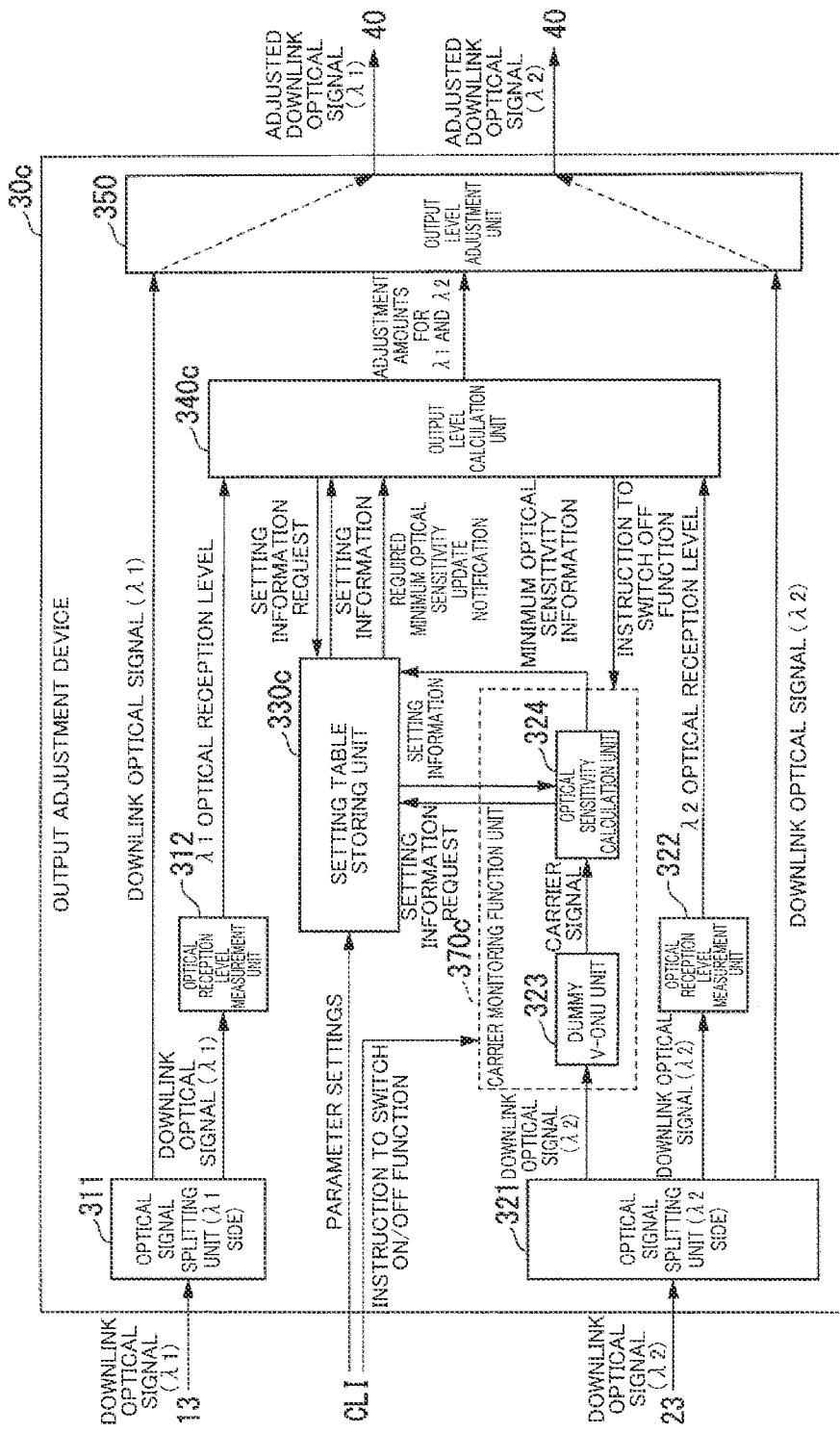
FIG. 5 is a block diagram showing a functional configuration of an output adjustment device according to a third embodiment of the present invention.

FIG. 5 is a block diagram showing a functional configuration of an output adjustment device 30c (carrier monitoring device) according to the third embodiment of the present invention. If the output level calculation unit 340c acquires a necessary minimum optical sensitivity update notification output from a setting table storing unit 330c, the output level calculation unit 340c outputs information indicating an instruction to switch OFF the carrier monitoring function to a carrier monitoring function unit 370c, as shown in FIG. 5.

The output level calculation unit 340c also outputs information indicating the instruction to switch OFF the carrier monitoring function to the carrier monitoring function unit 370c in the following case. Here, the aforementioned case refers to the case where the value of the minimum optical sensitivity based on the minimum optical sensitivity information output from the optical sensitivity calculation unit 324 to the setting table storing unit 330c is a better (smaller) value than the parameter value of the parameter (B) that is already set in the second setting table stored in the setting table storing unit 330c. For example, if the necessary minimum optical sensitivity update notification has not been output from the setting table storing unit 330c even after a predetermined time passed although the carrier monitoring function is in an ON state, the output level calculation unit 340c may output information indicating the instruction to switch OFF the carrier monitoring function to the carrier monitoring function unit 370c.

Figure 6:
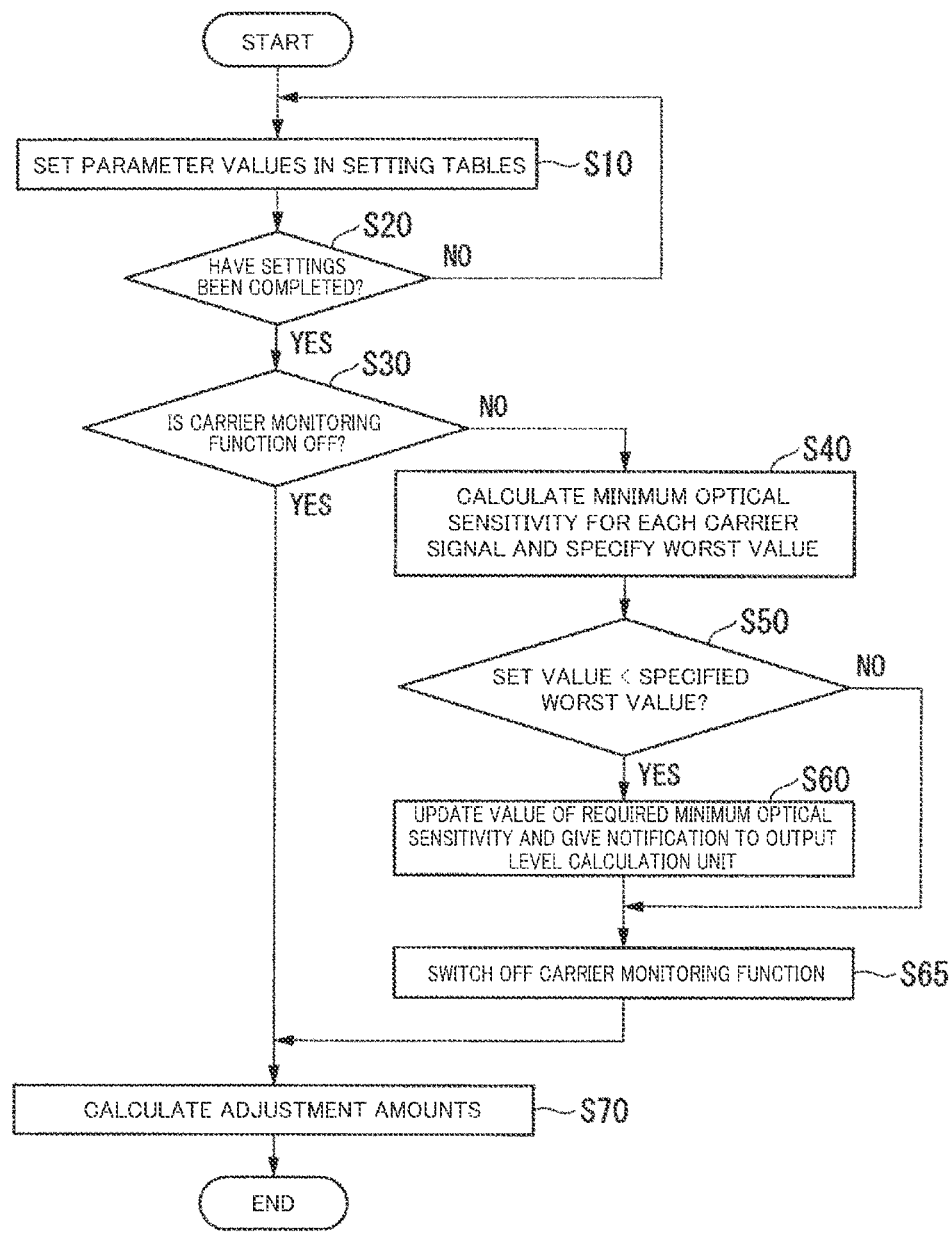
FIG. 6 is a flowchart showing processing for calculating adjustment amounts for signal levels of optical signals according to the third embodiment of the present invention.

FIG. 6 is a flowchart showing processing for calculating the adjustment amounts for the signal levels of the optical signals according to the third embodiment of the present invention. In the flowchart shown in FIG. 6, processing in step S65 is added to the flowchart in FIG. 4 showing processing for calculating the adjustment amounts for the signal levels of the optical signals according to the second embodiment. That is to say, after a series of processing from step S40 to step 60 has been performed, the carrier monitoring function of the carrier monitoring function unit 370c is switched OFF in accordance with ab instruction from the output level calculation unit 340c (step 365).

Due to the output level calculation unit 340c having a configuration for switching OFF the carrier monitoring function, an operation to switch OFF the carrier monitoring function using a CLI or the like is not necessary, and the operation efficiency increases.

Note that, after the carrier monitoring function is switched OFF by the output level calculation unit 340c, the OFF state is maintained, and the carrier monitoring function may be switched ON again by a CLI or the like immediately before a broadcast using a new carrier signal is started again.

Fourth Embodiment

The fourth embodiment of the present invention will be described below.

Figure 7:
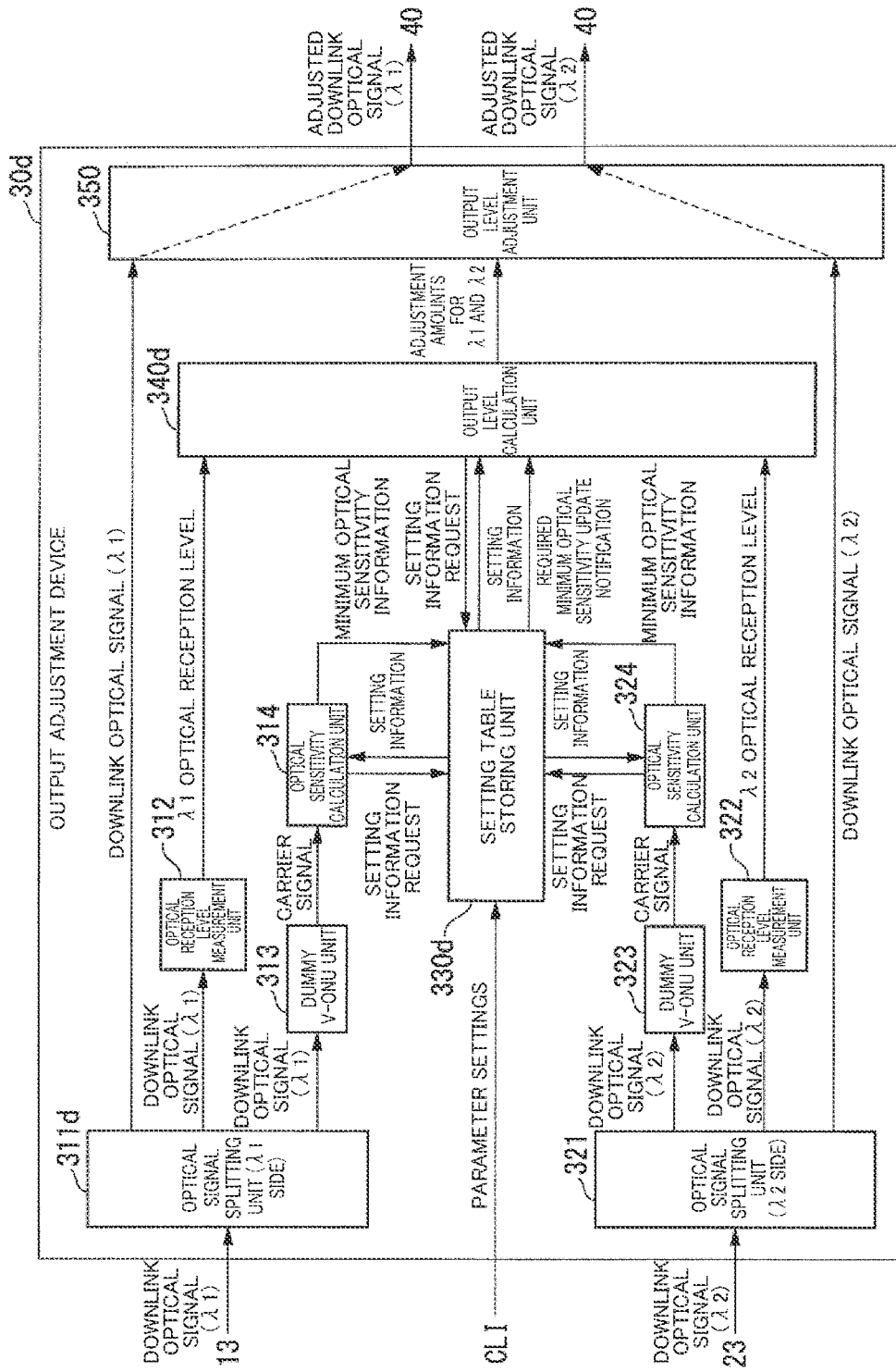
FIG. 7 is a block diagram showing a functional configuration of an output adjustment device according to a fourth embodiment of the present invention.

The above-described first to third embodiments has a configuration in which only the optical signal with the wavelength $\lambda 2$ is monitored by the carrier monitoring function. The present invention is not limited thereto, and the carrier monitoring function may only monitor the optical signal with the wavelength $\lambda 1$, or may monitor both the optical signal with the wavelength $\lambda 1$ and the optical signal with the wavelength $\lambda 2$. FIG. 7 is a block diagram showing a functional configuration of an output adjustment device 30d (carrier monitoring device) in which both the optical signal with the wavelength $\lambda 1$ and the optical signal with the wavelength $\lambda 2$ are monitored.

Due to the optical signal with the wavelength $\lambda 1$ being monitored by the carrier monitoring function, for example, even if the necessary minimum optical sensitivity worsens due to a new carrier signal being added to the optical signal with the wavelength $\lambda 1$ in the future, the output level of the optical signal that is output from the access amplifier 50 is appropriately controlled. Thus, viewers can watch the existing broadcasts and the newly-added broadcast.

Note that the above-described first to fourth embodiments have a configuration in which the WDM filter 40 is provided outside the output adjustment device 30 (30b, 30c, 30d). The present invention is not limited thereto, and the output adjustment device 30 (30b, 30c, 30d) may contain the WDM filter 40. In this case, a functional unit that corresponds to the function that the WDM filter 40 has (i.e. the function of multiplexing the optical signal with the wavelength $\lambda 1$ and the optical signal with the wavelength $\lambda 2$) is provided on the downstream side of the output level adjustment unit 350. Then, the multiplexed signal obtained by the WDM filter 40 is output from the output adjustment device 30 (30b, 30c, 30d) to the access amplifier 50.

Fifth Embodiment

The fifth embodiment of the present invention will be described below.

Figure 12:
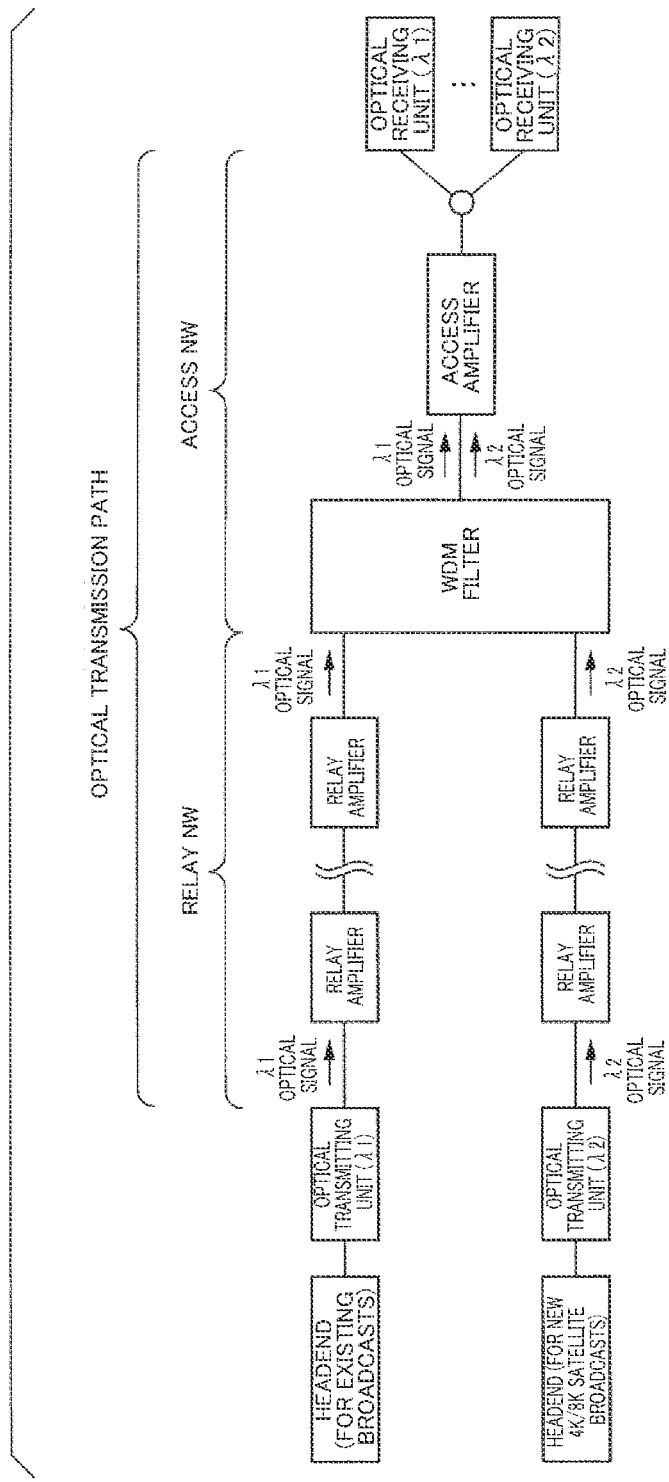
FIG. 12 is a block diagram showing an example of a network configuration of an FTTH CATV system that supports the new 4K/8K broadcasts.

In the above-described first to fourth embodiments, a network configuration shown in FIG. 12 is envisioned as a network configuration for realizing distribution and viewing of the new 4K/8K satellite broadcasts in addition to the existing broadcasts. The output adjustment device 30 (30b, 30c, 30d) for solving the aforementioned problem in that network configuration has been described. Note that the network configuration shown in FIG. 12 is a network configuration capable of realizing distribution and viewing of the new 4K/8K satellite broadcasts in addition to the existing broadcasts even if the existing relay amplifiers 13 do not support the new 4K/8K satellite broadcasts (i.e. do not support the optical signal with the wavelength $\lambda 2$).

Meanwhile, the present embodiment envisions a network configuration in which the existing relay amplifiers support both the optical signal with the wavelength $\lambda 1$ and the optical signal with the wavelength $\lambda 2$, and both optical signals can reach the access amplifier at a desired signal level over an existing optical transmission path. A description will be given of an FTTH CATV system that enables distribution and viewing of the new 4K/8K satellite broadcasts in addition to the existing broadcasts in the above network configuration.

Figure 8:
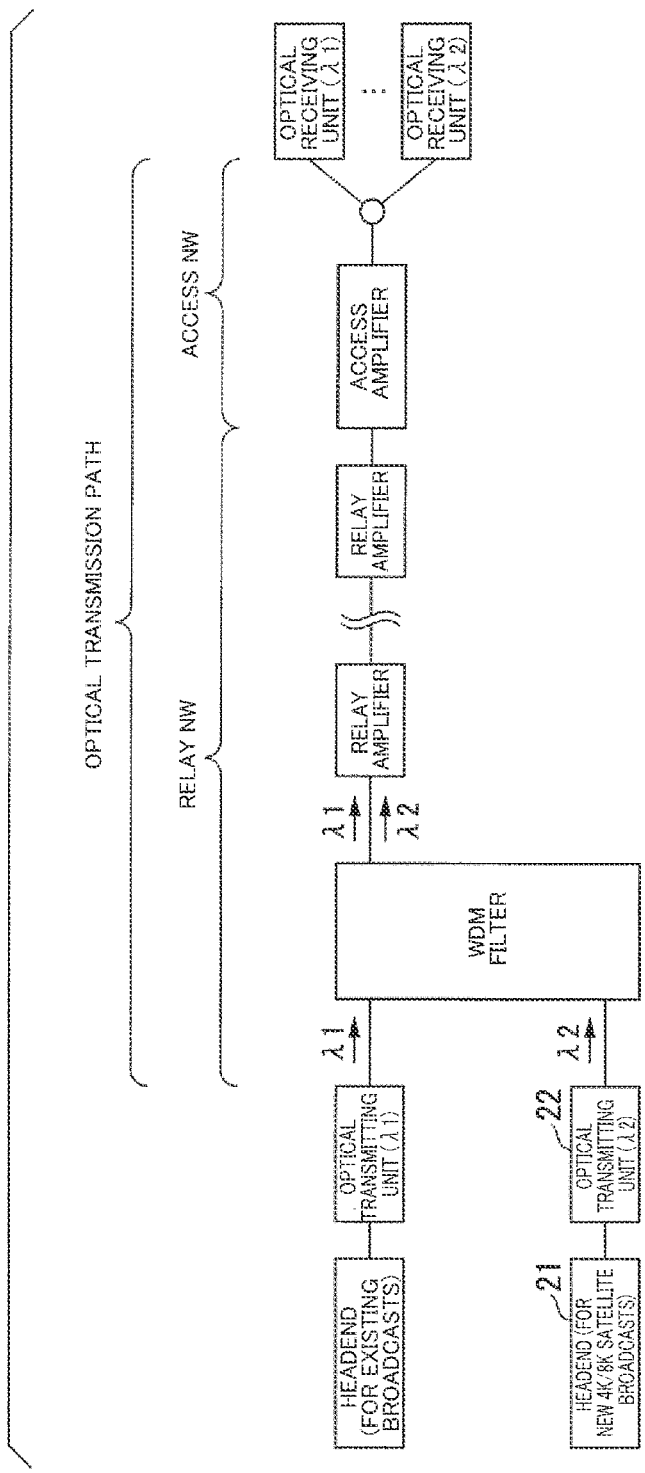
FIG. 8 is a block diagram showing an example of a network configuration of an FTTH CATV system that supports the new 4K/8K satellite broadcasts.

FIG. 8 is a block diagram showing an example of the network configuration envisioned in the present embodiment. In the network configuration shown in FIG. 8, the relay amplifiers support both the optical signal with the wavelength $\lambda 1$ and the optical signal with the wavelength $\lambda 2$, unlike the network configuration shown in FIG. 12. Thus, the WDM filter can be installed on the upstream side of the relay amplifiers. With this configuration, an optical signal (multiplexed signal) multiplexed by the WDM filter is input to the relay amplifiers, as shown in FIG. 8. By employing such a network configuration, no new relay amplifier needs to be installed to support the new 4K/8K satellite broadcasts. As a result, with the network configuration shown in FIG. 8, the installation cost or the like of the device to be newly installed is reduced compared with the network configuration shown in FIG. 12.

However, if the network configuration shown in FIG. 8 is used as-is, the same problem as that of the above-described first to fourth embodiments (i.e. the problem that viewers cannot watch a broadcast using a new carrier signal) may occur. Accordingly, the present embodiment will describe the case of installing an output adjustment device for the network configuration shown in FIG. 8 in order to solve this problem.

Network Configuration

Figure 9:
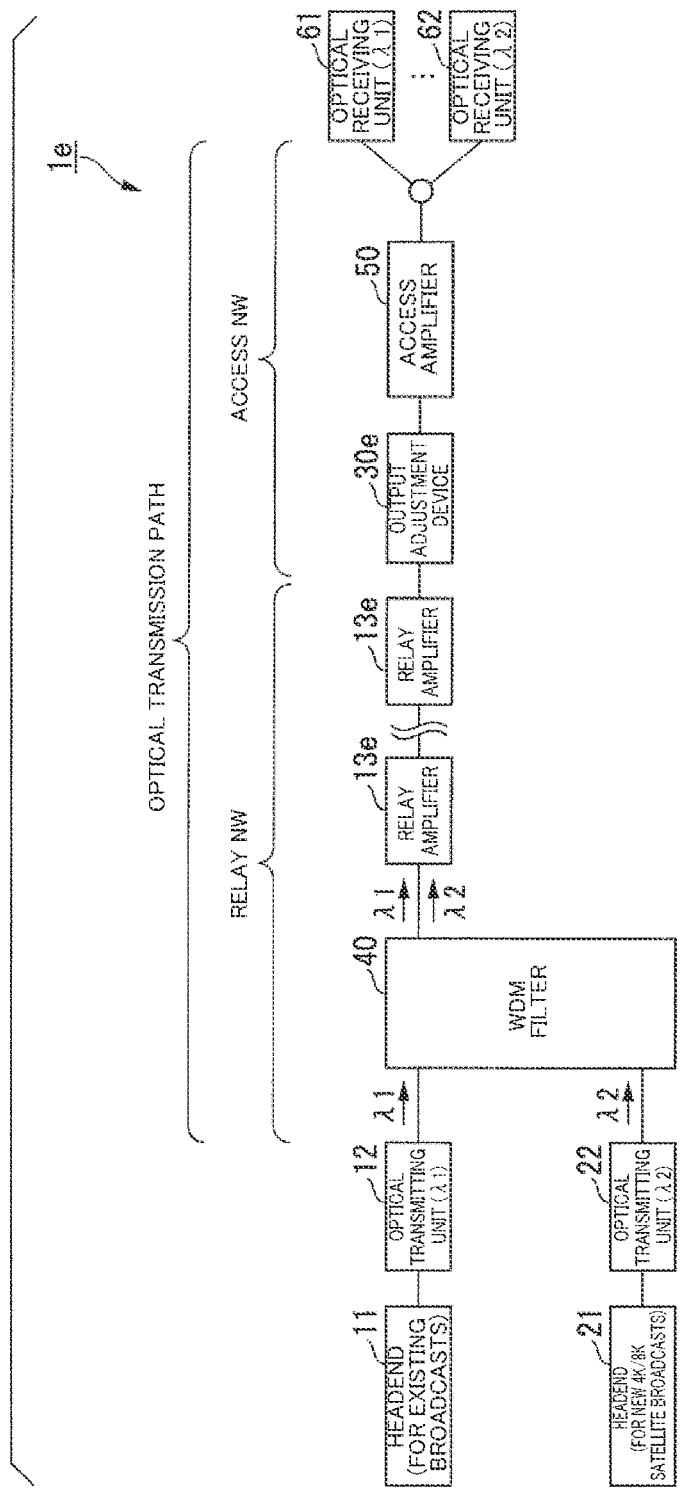
FIG. 9 is a block diagram showing a network configuration of an FTTH CATV system that supports the new 4K/8K satellite broadcasts according to a fifth embodiment of the present invention.

A description will be given below of a network configuration of an FTTH CATV system 1e that supports the new 4K/8K satellite broadcasts according to the fifth embodiment of the present invention. FIG. 9 is a block diagram showing an example of this network configuration. An output adjustment device 30e is installed on the upstream side of the access amplifier 50, similarly to the above-described first to fourth embodiments. However, as shown in FIG. 9, in the present embodiment, a multiplexed signal obtained by multiplexing the optical signal with the wavelength $\lambda 1$ and the optical signal with the wavelength $\lambda 2$ in the relay NW is transmitted to the output adjustment device 30e. For this reason, all of the optical signals that are input to and output from the output adjustment device 30e are multiplexed signals obtained by multiplexing the optical signals with the wavelength $\lambda 1$ and the optical signals with the wavelength $\lambda 2$.

Functional Configuration of Output Adjustment Device

Figure 10:
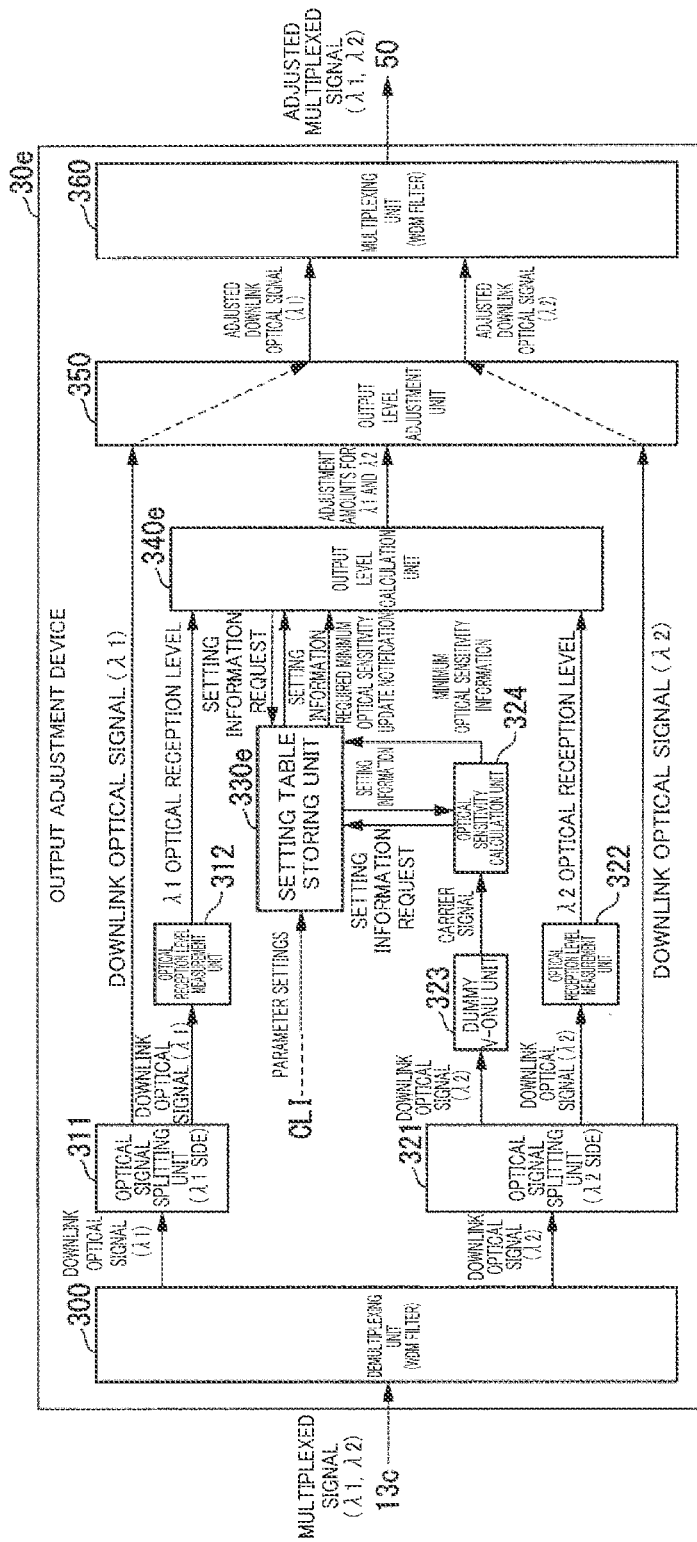
FIG. 10 is a block diagram showing a functional configuration of an output adjustment device according to the fifth embodiment of the present invention.

A description will be given below of a functional configuration of the output adjustment device 30e in an FTTH CATV system 1e according to the fifth embodiment of the present invention. FIG. 10 is a block diagram showing a functional configuration of the output adjustment device 30e (carrier monitoring device) according to the fifth embodiment of the present invention. As shown in FIG. 10, the functional configuration of the output adjustment device 30e differs from the functional configuration of the output adjustment device 30 according to the first embodiment shown in FIG. 2 in that a demultiplexing unit 300 and a multiplexing unit 360 are further provided. Note that functions of the other functional blocks included in the output adjustment device 30e are equal to the functions of the functional blocks included in the output adjustment device 30 according to the first embodiment, and are therefore assigned the same signs, and description thereof is omitted.

The demultiplexing unit 300 includes a filter circuit capable of demultiplexing an optical signal, such as a WDM filter, for example. The demultiplexing unit 300 demultiplexes a multiplexed signal sent out from a relay amplifier 13c into the optical signal with the wavelength $\lambda 1$ and the optical signal with the wavelength $\lambda 2$. Then, the demultiplexing unit 300 sends out the optical signal with the wavelength $\lambda 1$ to the optical signal splitting unit 311, and sends out the optical signal with the wavelength $\lambda 2$ to the optical signal splitting unit 321.

The multiplexing unit 360 includes a filter circuit capable of multiplexing optical signals, such as a WDM filter, for example. The multiplexing unit 360 multiplexes an adjusted optical signal with the wavelength $\lambda 1$ and an adjusted optical signal with the wavelength $\lambda 2$ that are sent out from the output level adjustment unit 350. The multiplexing unit 360 then sends out the multiplexed signal to the access amplifier 50.

Thus, in the present embodiment, the output adjustment device 30e first demultiplexes the input multiplexed signal into the optical signal with the wavelength $\lambda 1$ and the optical signal with the wavelength $\lambda 2$ using the demultiplexing unit 300 (e.g. a WDM filter). The output adjustment device 30e adjusts the optical levels of both of the demultiplexed optical signals. Then, the output adjustment device 30e multiplexes the adjusted optical signals again using the multiplexing unit 360 (e.g. a WDM filter), and outputs the multiplexed signal.

Sixth Embodiment

The sixth embodiment of the present invention will be described below.

In the above-described first to fifth embodiments, the carrier monitoring function is provided in the output adjustment device 30 (30b, 30c, 30d, 30e). However, the carrier monitoring function may alternatively be provided in an optical transmitter (e.g. the optical transmitting unit 12 and the optical transmitting unit 22 shown in FIG. 1). In this case, each of the optical transmitters that has the carrier monitoring function detects a new carrier signal and calculates the minimum optical sensitivity, for example. Then, the optical transmitter notifies the output adjustment device of the calculated value of the minimum optical sensitivity.

The method for this notification may be, for example, a method in which a control frame for notifying information indicating the value of the minimum optical sensitivity calculated by the optical transmitter is defined in advance, and the notification is given from the optical transmitter to the output adjustment device using this frame. Note that the operation of the output adjustment device after receiving the notification is the same as the operation performed after the setting table storing unit 330 (330*b*, 330*c*, 330*d*, 330*e*) acquires the minimum optical sensitivity information from the optical sensitivity calculation unit 324 in the above-described first to fifth embodiments.

Thus, according to the sixth embodiment, the output adjustment device can be configured to not have the carrier monitoring function but to only have a function of simply adjusting the signal levels of the input optical signals with the wavelength λ1 and the wavelength λ2 and output these optical signals.

As described above, the output adjustment device 30 (30*b*, 30*c*, 30*d*, 30*e*) according to the above-described embodiments adjusts a plurality of output optical signals from an amplifier (access amplifier 50) for an optical access network at respective appropriate network. Here, the amplifier collectively amplifies a plurality of optical signals with different wavelengths that are obtained by performing FM batch conversion on a plurality of multi-channel video signals. The output adjustment device 30 (30*b*, 30*c*, 30*d*, 30*e*) obtains the amount of frequency deviation of each carrier signal in the multi-channel video signals, with respect to at least one of the plurality of optical signals with different wavelengths, and calculates the minimum optical sensitivity at the optical receiving unit based on the amount of frequency deviation. Then, the output adjustment device 30 (30*b*, 30*c*, 30*d*, 30*e*) measures the signal levels of the plurality of optical signals with different wavelengths. The output adjustment device 30 (30*b*, 30*c*, 30*d*, 30*e*) then calculates, based on the measurement results, a necessary signal level for the plurality of optical signals output from the amplifier such that the sum of the signal levels satisfies the output adjustment device on the specifications (or the settings), and the signal level after each of the optical signals has been transmitted to the optical receiving unit installed at each subscriber's house satisfies the minimum optical sensitivity. The output adjustment device 30 (30*b*, 30*c*, 30*d*, 30*e*) then adjusts the signal levels of the plurality of optical signals in accordance with the calculated necessary signal level, and outputs the adjusted optical signals to the amplifier.

According to the FTTH CATV system according to each of the above embodiments, due to having the above-described configuration, a plurality of multi-channel video signals included in a plurality of optical signals that have been subjected to FM batch conversion are appropriately received at the optical receiving unit installed at each subscriber's house. Thus, even if a broadcast using a new carrier signal is added, viewers can watch both the existing broadcasts and the new broadcast.

Some or all of the optical sensitivity calculation unit 324, the setting table storing unit 330 (330*b*, 330*c*, 330*d*, 330*e*), and the output level calculation unit 340 (340*b*, 330*c*, 340*d*, 340*e*) included in the output adjustment device 30 (30*b*, 30*c*, 30*d*, 30*e*) according to the above-described embodiments may be realized by a computer. In that case, these units may be realized by recording a program for realizing these functions in a computer-readable recording medium, and loading the program recorded in this recording medium to a computer system and executing the loaded program. Note that the "computer system" here includes an OS and hardware such as peripheral devices. The "computer-readable recording medium" refers to a storage device that is any of portable media such as a flexible disk, a magneto-optical disk, a ROM, and a CD-ROM, a hard disk contained in the computer system, or the like. Furthermore, the "computer-readable recording medium" may also include one that dynamically holds the program for a short period, such as a communication line used in the case of transmitting a program via a network such as a the Internet or a communication line such as a telephone line, and one that holds the program for a fixed period, such as a volatile memory in a computer system that serves as a server or a client in that case. The aforementioned program may be one that realize some of the above-described functions, or may be one that can realize the above-described functions by being combined with a program that is already recorded in the computer system, or may be one that is realized using hardware such as a PLD (Programmable Logic Device) or an FPGA (Field Programmable Gate Array).

Although the embodiments of the present invention have been described above with reference to the drawings, the above embodiments are merely examples of the present invention, and it is apparent that the present invention is not limited to the above embodiments. Accordingly, constituent elements may be added, omitted, replaced, or modified in other ways without departing from the technical idea and the gist of the present invention.

REFERENCE SIGNS LIST

1, 1*c* FTTH CATV system
11, 21 Headend
12, 22 Optical transmitting unit
13, 13*e*, 23 Relay amplifier
30, 30*b*, 30*c*, 30*d*, 30*e* Output adjustment device
40 WDM filter
50 Access amplifier
61, 62 Optical receiving unit
70 Optical transmission path
71 Relay NW
72 Access NW
300 Demultiplexing unit
311, 321 Optical signal splitting unit
312, 322 Optical reception level measurement unit
323 Dummy V-ONU unit
324 Optical sensitivity calculation unit
330, 330*b*, 330*c*, 330*d*, 330*e* Setting table storing unit
340, 340*b*, 340*c*, 340*d*, 340*e* Output level calculation unit
350 Output level adjustment unit
360 Multiplexing unit
370, 370*b*, 370*c* Carrier monitoring function unit

The invention claimed is:

1. An optical transmission system comprising: a first optical transmitting unit for transmitting a first optical signal having a first wavelength that is obtained as a result of first frequency-multiplexed multi-channel signals being converted by means of FM batch conversion; a second optical transmitting unit for transmitting a second optical signal having a second wavelength different from the first wavelength that is obtained as a result of second frequency-multiplexed multi-channel signals being converted by means of FM batch conversion; a carrier monitoring function unit for acquiring the first optical signal and monitoring each carrier signal included in the acquired optical signal; an output adjustment unit for acquiring the first optical signal and the second optical signal, adjusting signal intensities of the acquired optical signals, and outputting the optical signals; a multiplexer for multiplexing the first optical signal and the second optical signal that have been subjected to signal intensity adjustment by the output adjustment unit, and outputting a multiplexed signal; an amplifier for amplifying the multiplexed signal; a first optical receiving unit for receiving the first optical signal included in the multiplexed signal that has been amplified by the amplifier; and a second optical receiving unit for receiving the second optical signal included in the multiplexed signal that has been amplified by the amplifier, wherein the carrier monitoring function unit obtains an amount of frequency deviation of each carrier signal included in the first optical signal, and calculates a minimum optical sensitivity at the first optical receiving unit based on the amount of frequency deviation, and the output adjustment unit adjusts the signal intensities of the acquired first optical signal and second optical signal such that the signal intensity of the first optical signal received by the first optical receiving unit is larger than or equal to a first predetermined value, and the signal intensity of the second optical signal received by the second optical receiving unit is larger than or equal to a second predetermined value, and updates the first predetermined value based on the minimum optical sensitivity at the first optical receiving unit calculated by the carrier monitoring function unit.

2. The optical transmission system according to claim 1, wherein the output adjustment unit adjusts the signal intensities of the first optical signal and the second optical signal such that a signal intensity of the multiplexed signal output from the amplifier is a third predetermined value.

3. The optical transmission system according to claim 1, wherein the output adjustment unit adjusts the signal intensities of the first optical signal and the second optical signal based on insertion loss that occurs in the multiplexer, and transmission loss that occurs between the amplifier and the first optical receiving unit and between the amplifier and the second optical receiving unit.

4. The optical transmission system according claim 1, wherein the carrier monitoring function unit further acquires the second optical signal, obtains an amount of frequency deviation of each carrier signal included in the second optical signal, and calculates a minimum optical sensitivity at the second optical receiving unit based on the amount of frequency deviation, and the output adjustment unit further updates the second predetermined value based on the minimum optical sensitivity at the second optical receiving unit calculated by the carrier monitoring function unit.

5. The optical transmission system according to claim 1, further comprising a second multiplexer for multiplexing the first optical signal transmitted from the first optical transmitting unit and the second optical signal transmitted from the second optical transmitting unit, wherein the output adjustment unit acquires an optical signal multiplexed by the second multiplexer, demultiplexes the acquired optical signal into the first optical signal and the second optical signal, adjusts signal intensities of the demultiplexed first optical signal and second optical signal, and outputs the first optical signal and the second optical signal.

6. The optical transmission system according claim 1, wherein the output adjustment unit calculates a first necessary signal intensity that is a signal intensity that the first optical signal included in the multiplexed signal output from the amplifier is required to have, based on the first predetermined value, insertion loss that occurs in the multiplexer, and transmission loss that occurs between the amplifier and the first optical receiving unit, calculates a second necessary signal intensity that is a signal intensity that the second optical signal included in the multiplexed signal output from the amplifier is required to have, based on the second predetermined value, insertion loss that occurs in the multiplexer, and transmission loss that occurs between the amplifier and the second optical receiving unit, calculates respective output signal intensities of the first optical signal and the second optical signal that are included in the multiplexed signal output from the amplifier so as to satisfy the first necessary signal intensity and the second necessary signal intensity, respectively, calculates respective input signal intensities of the first optical signal and the second optical signal that are included in the multiplexed signal input to the amplifier, the input signal intensities being required to achieve the calculated output signal intensities, and calculates respective adjustment amounts for the signal intensities of the acquired first optical signal and second optical signal, based on a result of measuring the signal intensities of the acquired first optical signal and second optical signal and the calculated respective input signal intensities.

7. A carrier monitoring device that adjusts respective signal intensities of a first optical signal and a second optical signal that are included in a multiplexed signal input to an amplifier for amplifying the first optical signal and the second optical signal, the first optical signal being an optical signal having a first wavelength that is obtained as a result of first frequency-multiplexed multi-channel signals being converted by means of FM batch conversion and that is to be transmitted to a first optical receiving unit, the second optical signal being an optical signal having a second wavelength different from the first wavelength that is obtained as a result of second frequency-multiplexed multi-channel signals being converted by means of FM batch conversion and that is to be transmitted to a second optical receiving unit, the carrier monitoring device comprising: a first acquisition unit for acquiring the first optical signal; a second acquisition unit for acquiring the second optical signal; a first measurement unit for measuring a signal intensity of the first optical signal acquired by the first acquisition unit; a second measurement unit for measuring a signal intensity of the second optical signal acquired by the second acquisition unit; an adjustment amount calculation unit for calculating respective adjustment amounts for the signal intensity of the first optical signal acquired by the first acquisition unit and the signal intensity of the second optical signal acquired by the second acquisition unit, based on a measurement result of the measurement performed by the first measurement unit and a measurement result of the measurement performed by the second measurement unit, such that the signal intensity of the first optical signal received by the first optical receiving unit is larger than or equal to a first predetermined value, the signal intensity of the second optical signal received by the second optical receiving unit is larger than or equal to a second predetermined value, and a signal intensity of the multiplexed signal output from the amplifier is larger than or equal to a third predetermined value; a signal intensity adjustment unit for adjusting the signal intensity of the first optical signal acquired by the first acquisition unit and the signal intensity of the second optical signal acquired by the second acquisition unit based on the respective adjustment amounts calculated by the adjustment amount calculation unit, and outputting the first optical signal and the second optical signal that have been subjected to the signal intensity adjustment; and a carrier monitoring function unit for obtaining an amount of frequency deviation of each carrier signal included in the first optical signal or the second optical signal, calculating a minimum optical sensitivity at the first optical receiving unit or the second optical receiving unit based on the amount of frequency deviation, and updating the first predetermined value or the second predetermined value based on the minimum optical sensitivity.

* * * * *